US010550825B2

(12) United States Patent
Borøy et al.

(10) Patent No.: US 10,550,825 B2
(45) Date of Patent: Feb. 4, 2020

(54) METHOD OF BUILDING AN OFFSHORE WINDMILL

(71) Applicant: National Oilwell Varco Norway AS, Kristiansand S (NO)

(72) Inventors: Yngvar Borøy, Søgne (NO); Thor Strand, Kristiansand (NO)

(73) Assignee: NATIONAL OILWELL VARCO NORWAY AS, Kristiansand S (NO)

( * ) Notice: Subject to any disclaimer, the term of this patent is extended or adjusted under 35 U.S.C. 154(b) by 0 days.

(21) Appl. No.: 16/328,160

(22) PCT Filed: Aug. 22, 2017

(86) PCT No.: PCT/EP2017/071095
§ 371 (c)(1),
(2) Date: Feb. 25, 2019

(87) PCT Pub. No.: WO2018/041663
PCT Pub. Date: Mar. 8, 2018

(65) Prior Publication Data
US 2019/0186465 A1  Jun. 20, 2019

(30) Foreign Application Priority Data
Sep. 2, 2016 (EP) .................................... 16186996

(51) Int. Cl.
F03D 13/25 (2016.01)
E02B 17/08 (2006.01)
(Continued)

(52) U.S. Cl.
CPC ............ F03D 13/25 (2016.05); B63B 35/003 (2013.01); B63B 35/44 (2013.01); B66C 23/52 (2013.01);
(Continued)

(58) Field of Classification Search
CPC ..... E02B 2017/0091; E02B 2017/0047; E02B 2017/0043; E02B 2017/0065; E02B 17/08;
(Continued)

(56) References Cited

U.S. PATENT DOCUMENTS 10,150,653 B2 * 12/2018 Kyllingstad .......... B66C 13/066
2006/0120809 A1 * 6/2006 Ingram ................... E02D 27/42
405/195.1
(Continued)

FOREIGN PATENT DOCUMENTS

DE       10111280    7/2002
GB       2365905     2/2002
(Continued)

OTHER PUBLICATIONS

Written Opinion for PCT/EP2017/071095 dated Nov. 24, 2017 (3 pages).
(Continued)

Primary Examiner — Carib A Oquendo
(74) Attorney, Agent, or Firm — Conley Rose, P.C.

(57) ABSTRACT

A method of building an offshore windmill includes, using a 3D-heave-compensated crane, placing on a windmill pedestal a lifting jack having a receiving region, and fixing the lifting jack to the windmill pedestal such that the lifting jack can be later removed, and such that a windmill column can be placed within the receiving region directly on the windmill pedestal. The windmill generator is installed using the 3D-heave-compensated crane. The windmill column is partially erected on the windmill pedestal using the 3D-heave-compensated crane and the lifting jack. Before the windmill is fully erected, windmill blades are placed on the windmill generator using the 3D-heave-compensated crane, and the erection of the windmill column on the windmill pedestal is
(Continued)

completed using at least the lifting jack. Using the 3D-heave-compensated crane, the lifting jack is removed from the windmill pedestal.

16 Claims, 26 Drawing Sheets

(51) Int. Cl.
    *B63B 35/00*         (2006.01)
    *B63B 35/44*         (2006.01)
    *B66C 23/52*         (2006.01)
    *E04H 12/34*         (2006.01)
    *E02B 17/00*         (2006.01)
    *B66C 13/10*         (2006.01)

(52) U.S. Cl.
    CPC .......... *E02B 17/08* (2013.01); *E04H 12/344* (2013.01); *B63B 2035/446* (2013.01); *B66C 13/105* (2013.01); *E02B 2017/0043* (2013.01); *E02B 2017/0047* (2013.01); *E02B 2017/0065* (2013.01); *E02B 2017/0091* (2013.01); *F05B 2230/60* (2013.01)

(58) Field of Classification Search
    CPC .......... F03D 13/10; F03D 13/25; F03D 13/40; B63B 2035/446; B63B 35/003; B63B 35/44; B66C 23/52; F05B 2230/6102; F05B 2240/95; F05B 2230/60
    See application file for complete search history.

(56) References Cited

U.S. PATENT DOCUMENTS

2018/0282134 A1* 10/2018 Lagerweij ............. B66C 23/185
2018/0290864 A1* 10/2018 Garitaonandia Aramberri ............
                                                  B66C 23/185

FOREIGN PATENT DOCUMENTS

| JP | 2005042313 | 2/2005 |
| WO | WO03100248 | 12/2003 |
| WO | WO2007009464 | 1/2007 |
| WO | 2010151145 | 12/2010 |
| WO | WO2015150594 | 10/2015 |

OTHER PUBLICATIONS

International Search Report for PCT/EP2017/071095 dated Nov. 24, 2017 (6 pages).
European Search Report for EP 16186996.1 dated Mar. 3, 2017.
English Translation of Abstract for DE10111280 (1page).
English Translation of Abstract for JP 2005042313 (1 page).

* cited by examiner

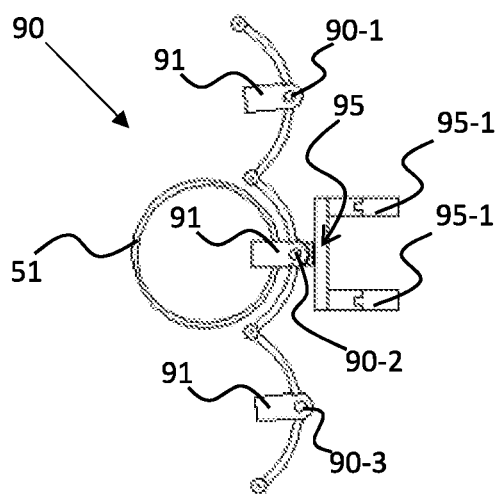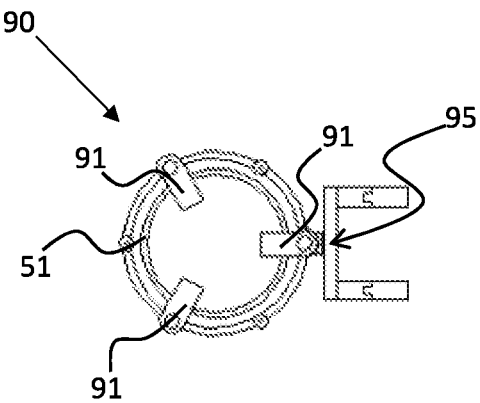
FIG. 26a  FIG. 26b
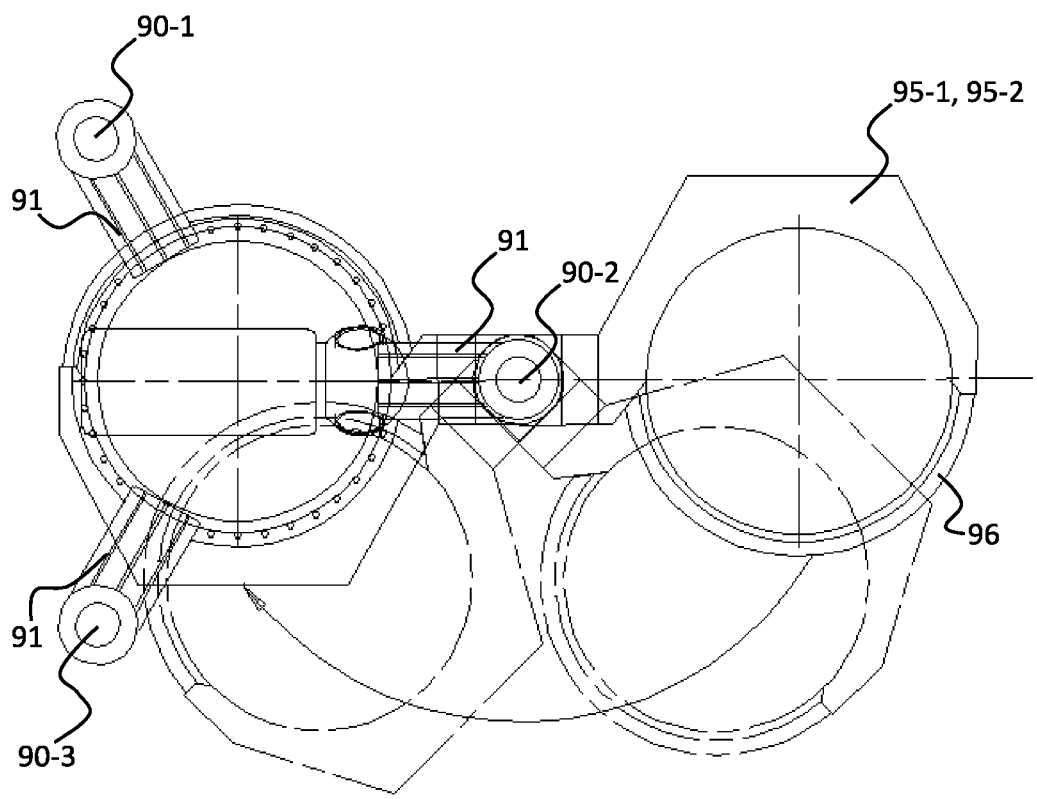
FIG. 27

METHOD OF BUILDING AN OFFSHORE WINDMILL

CROSS REFERENCE TO RELATED APPLICATIONS

This application is a 35 U.S.C. § 371 national stage application of PCT/EP2017/071095 filed Aug. 22, 2017 and entitled "Method of Building an Offshore Windmill", which claims priority to European Patent Application No. 16186996.1 filed Sep. 2, 2016, each of which is incorporated herein by reference in their entirety for all purposes.

STATEMENT REGARDING FEDERALLY SPONSORED RESEARCH OR DEVELOPMENT

Not applicable.

FIELD OF THE INVENTION

The invention relates to a method of building an offshore windmill on a windmill pedestal that is located offshore.

BACKGROUND

Offshore wind energy is becoming more and more important. In particular, in the last couple of years, there has been an enormous increase in the number of wind farms (a grid of windmills placed on the continental shelf in the seas). Not only is the number of offshore windmills increasing, but also their size, i.e. the windmills are getting bigger. The latter brings new challenges in terms of actually installing these offshore windmills. Dedicated huge ships have been built having very large heavy duty cranes placed on top of them. The general idea is to manufacture the windmills onshore in as large parts as possible and then transport these parts to the desired location, where they are placed using the ever-increasing heavy-duty cranes on an earlier prepared offshore windmill pedestal. There exists a huge variety of different technologies of preparing and building such windmill pedestals offshore, but that is beyond the scope of what is claimed herein as an invention. As the size of the offshore windmills increases further, also the size of these dedicated windmill installation ships is increasing. In order to facilitate the use of a huge crane these ships are provided with a jack-up system such that they lift themselves out of the sea, which makes the ships orientation independent of the waves. It is particularly the operational costs of these ships, which is of concern.

In the prior art some suggestions are reported to resolve this issue.

GB2,365,905A discloses an offshore structure comprising a watertight chamber having a base, which rests on the seabed and a telescopically extendable shaft, which extends upwardly from the chamber, with a hoist located at the shaft top. A wind turbine may be located at the top of the shaft, while a generator may be located in the base. The structure may be towed floating with the column retracted to its installation point, where the base is then ballasted to its resting position on the seabed. The column may then be extended and grouted in place, while the hoist may be used to raise the rotor hub and blades to the required position at the top of the column.

WO2010/151145A1 discloses a windmill comprising a generator house with a generator (also being referred to as "nacelle") and a plurality of rotor blades at an upper part of an upright shaft. Said shaft comprises at least one telescopic joint for altering the height of said windmill, and further comprises a pivotal connection of the blades between a substantially vertical and a substantially horizontal position. The respective disclosure relates to a method of installation, intervention or decommissioning of said windmill. It finds application to fixed, bottom mounted offshore windmills or onshore windmills.

A first disadvantage of the above-presented windmills and installation methods is that they are not retrofit solutions, i.e. they cannot be applied to existing offshore windmill pedestals. In addition, said methods and windmills are not easily scaled up. Thus, there is a need for a further improved retrofit method of building offshore windmills.

SUMMARY OF THE DISCLOSED EMBODIMENTS

The present disclosure directed to remedying or reducing at least one of the drawbacks of the prior art, or at least provide a useful alternative to prior art.

In a first aspect this disclosure relates to a method of building an offshore windmill on a windmill pedestal that is located offshore. In some embodiments, the method comprises:

placing a lifting jack having a receiving region on the windmill pedestal using a 3D-heave-compensated crane that is positioned on a floating vessel, and fixing the lifting jack to the windmill pedestal such that the lifting jack can be later removed, and such that a windmill column can be placed within the receiving region directly on the windmill pedestal;

installing a windmill generator using the 3D-heave-compensated crane;

partially erecting the windmill column on the windmill pedestal using the 3D-heave-compensated crane and the lifting jack;

installing a plurality of windmill blades on the windmill generator using the 3D-heave-compensated crane at a stage where the windmill column has been partially, but not fully, erected;

completing the erection of the windmill column on the windmill pedestal using at least the lifting jack;

the lifting jack from the windmill pedestal using the 3D-heave-compensated crane.

In some embodiments, the method comprises:
providing a floating vessel comprising a 3D-heave-compensated crane on a deck thereof;
providing at least one offshore windmill assembly and a lifting jack, wherein the offshore windmill assembly comprises a windmill generator, a plurality of windmill blades and at least two windmill column parts for forming a windmill column at a later stage, wherein the lifting jack is configured for receiving the windmill column in a receiving region thereof;
moving said floating vessel, the lifting jack and the at least one offshore windmill assembly in proximity of the windmill pedestal;
placing the lifting jack directly on the windmill pedestal using the 3D-heave-compensated crane and fixing the lifting jack to the windmill pedestal such that it can be later removed, and wherein the lifting jack is fixed to the windmill pedestal such that the windmill column can be placed within the receiving region directly on the windmill pedestal;
installing the windmill generator using the 3D-heave-compensated crane;

partially erecting the windmill column on the windmill pedestal using the 3D-heave-compensated crane and the lifting jack;

installing the windmill blades on the windmill generator using the 3D-heavecompensated crane at a stage where the windmill column has been partially erected;

fully erecting the windmill column on the windmill pedestal using at least the lifting jack, and removing the lifting jack from the windmill pedestal using the 3D-heave-compensated crane.

In order to facilitate understanding of this disclosure one or more expressions are further defined hereinafter.

The effects of the method in accordance with this disclosure are as follows.

A first feature of this disclosure is that a floating vessel is provided having a 3D-heave-compensated crane. Throughout this specification the wording "3D-heave-compensated crane" refers to a crane, which has a system in place for keeping the load of the crane substantially free of movement due to waves in all three dimensions. Expressed differently, it refers to a crane having heave-compensation for the three position degrees of freedom of the load. In addition, there might even be heave-compensation for one or more rotation degrees of freedom, but that is not essential to this disclosure. As mentioned in the background of this disclosure often very large dedicated jack-up ships having very large cranes are used. By providing a 3D-heave compensated crane, it is rendered possible to use much smaller mainstream vessels, such as standard offshore crane vessels.

Another feature of this disclosure is that the offshore windmill is shipped towards the windmill pedestal in parts. The offshore windmill parts and the lifting jack may be shipped on the same vessel (having the crane) or on (a) different vessel(s). Important to note is that the windmill pedestal does not need to be substantially altered for facilitating the building of the windmill, i.e. the solution is fully retrofit. In the prior art solutions discussed in the background section special pedestal constructions are required to enable the suggested solutions.

A third feature of this disclosure is that a temporary lifting jack is provided, which means that the lifting jack is first added to the structure (that is directly on the windmill pedestal, or on the pedestal adapter if this one has been installed on the windmill pedestal first) and later removed after the building of the offshore windmill is finished. The lifting jack plays an important role in the actual building of the offshore windmill as will be more obviated in the detailed description of the figures.

A further feature is that the respective parts (the windmill generator, the windmill column (parts) and the windmill blades) of the offshore windmill are brought to the windmill pedestal one after the other, wherein the order of these parts is cleverly chosen to facilitate the building of the windmill in an efficient way and using a crane, which is much smaller than the existing cranes that are used for a windmill of a similar size. One of the reasons is that parts like the windmill generator and the windmill blades are installed before the windmill column is fully erected. Expressed differently, the windmill column is effectively erected to its final height after installation of these parts. Another reason is that the windmill column is partially erected before the windmill blades are installed. This allows for vertical installation, without the need for special hinge constructions as is the case in one of the prior art solutions. Another reason is that the windmill column is built on top of the pedestal without altering it.

It must be stressed that the amount of variations concerning the order of method steps is very large and that by no means the order as mentioned in the claims below is to be construed as limiting the claims. All variations in order are considered to fall within the scope of the claimed invention, unless such order would result in something unfeasible.

In an embodiment of the method in accordance with this disclosure the method further comprises, before the step of placing the lifting jack, a step of preparing the windmill pedestal for receiving the lifting jack, for instance by placing a pedestal adaptor on the windmill pedestal. The lifting jack must be fixed to the windmill pedestal such that it hangs or stands on it, and in this embodiment that is done via the pedestal adaptor. However, it is also possible to modify the lifting jack such that it can be removably mounted to the pedestal, i.e. rendering the pedestal adaptor superfluous.

In an embodiment of the method in accordance with this disclosure, in the step of installing the windmill generator, the windmill generator is installed on the lifting jack. This embodiment is very advantageous, because it facilitates the provision of the windmill generator very early in the building process. The lifting jack may be in retracted or extended position, when placing the windmill generator. Each of these positions has their own advantages. More information will be given in the detailed description of the figures.

In an embodiment of the method in accordance with this disclosure, in the step of partially erecting the windmill column, at least a first one of the at least two windmill column parts is installed on the windmill pedestal, and, in the step of fully erecting the windmill column, the remaining ones of the windmill column parts are installed using the lifting jack for creating room between the windmill pedestal and the remaining part of the windmill column, as well as using the 3D-heave-compensated crane for moving the respective windmill column parts from the floating vessel to the pedestal. This embodiment constitutes a first main variant of building up the windmill column from bottom to top.

There is a great freedom in terms of the stage of the method, wherein the first windmill column part is installed. In a first variant, this first part of the windmill column may be installed even before placement of the lifting jack, such that the lifting jack is to be placed over or around the first column part. In a second variant, this first part of the windmill column may be installed between the placement of the lifting jack and the installing of the windmill generator, wherein the windmill generator is then to be placed on the first column part. In a third variant, this first part of the windmill column may be installed after installing of the windmill generator, but then the lifting jack must be extended to create the place between the windmill pedestal and the windmill generator. It is not unlikely that more variants are found by the person skilled in the art just using his normal routine and expertise.

In an embodiment of the method in accordance with this disclosure, in the step of providing the floating vessel, the at least two windmill column parts that are provided on the floating vessel are in the form of a telescopic windmill column in its retracted state. This embodiment facilitates faster building of the offshore windmill, but also the building of higher windmills, in particular when a plurality of telescopic windmill column parts are provided.

In an embodiment of the method in accordance with this disclosure, in the step of partially erecting the windmill column, the telescopic windmill column is installed in its retracted state on the windmill pedestal, and, in the step of fully erecting the windmill column, the lifting jack is used to extend the telescopic windmill column. This embodiment builds further on the previously-mentioned embodiment and constitutes a second main variant of building up the windmill column from bottom to top. In case the telescopic windmill column comprises more than two parts, the extension of the column can be done using multiple runs of the lifting jack. In each next run, the lifting jack is fixed to a different one of the respective parts of the telescopic column, until all respective parts of the telescopic column have been extended and the telescopic column has reached its maximum length. More information will be given in the detailed description of the figures.

It must be stressed that the first and second main variant of building up the windmill column may also be combined, in that the column is build up out of a telescopic part in combination with one or more further parts, or even one or more further telescopic parts. The lifting jack of this disclosure may be conveniently used to lift up/extend these telescopic parts and further telescopic parts one after the other.

In an embodiment of the method in accordance with this disclosure, in the step of installing the windmill blades, the windmill blades are installed sequentially, wherein the windmill generator is used to manipulate a position of a windmill hub of the windmill generator such that the respective windmill blade can be easily mounted thereto, preferably in its vertical downward-pointing direction. This embodiment facilitates the use of a smaller crane to mount the windmill blades or the building of larger windmills using the same crane size.

In an embodiment of the method in accordance with this disclosure, in the step of providing the floating vessel, the floating vessel is provided with an enhanced lifting jack that further comprises a cradle that is configured for i) receiving respective windmill parts, for ii) bringing said parts from a lower end of the lifting jack to an upper end of lifting jack for iii) manipulating, i.e. rotating, said parts to a vertical position, where necessary, and for iv) bringing said parts to said receiving region. This embodiment facilitates the building of even larger windmills as the enhanced lifting jack partially takes over the function of the crane. The main thing the crane needs to do in this embodiment is to put the respective parts on the cradle, while most of the other operations are carried out by the cradle. The enhanced lifting jack is explained in more detail in the detailed description of the figures.

BRIEF INTRODUCTION OF THE DRAWINGS

In the following is described examples of embodiments illustrated in the accompanying drawings, wherein:

FIG. 26a shows a top view of an embodiment of an advanced lifting jack in accordance with this disclosure, wherein the lifting jack is in an open position;

FIG. 26b shows a top view of the lifting jack of FIG. 26a, wherein the lifting jack is in a closed position; and FIG. 27 shows a more detailed top view of the lifting jack of FIG. 26b, wherein the cradle is swung from an outer position to a centre position.

DETAILED DESCRIPTION OF THE DISCLOSED EXEMPLARY EMBODIMENTS

Figure 1:
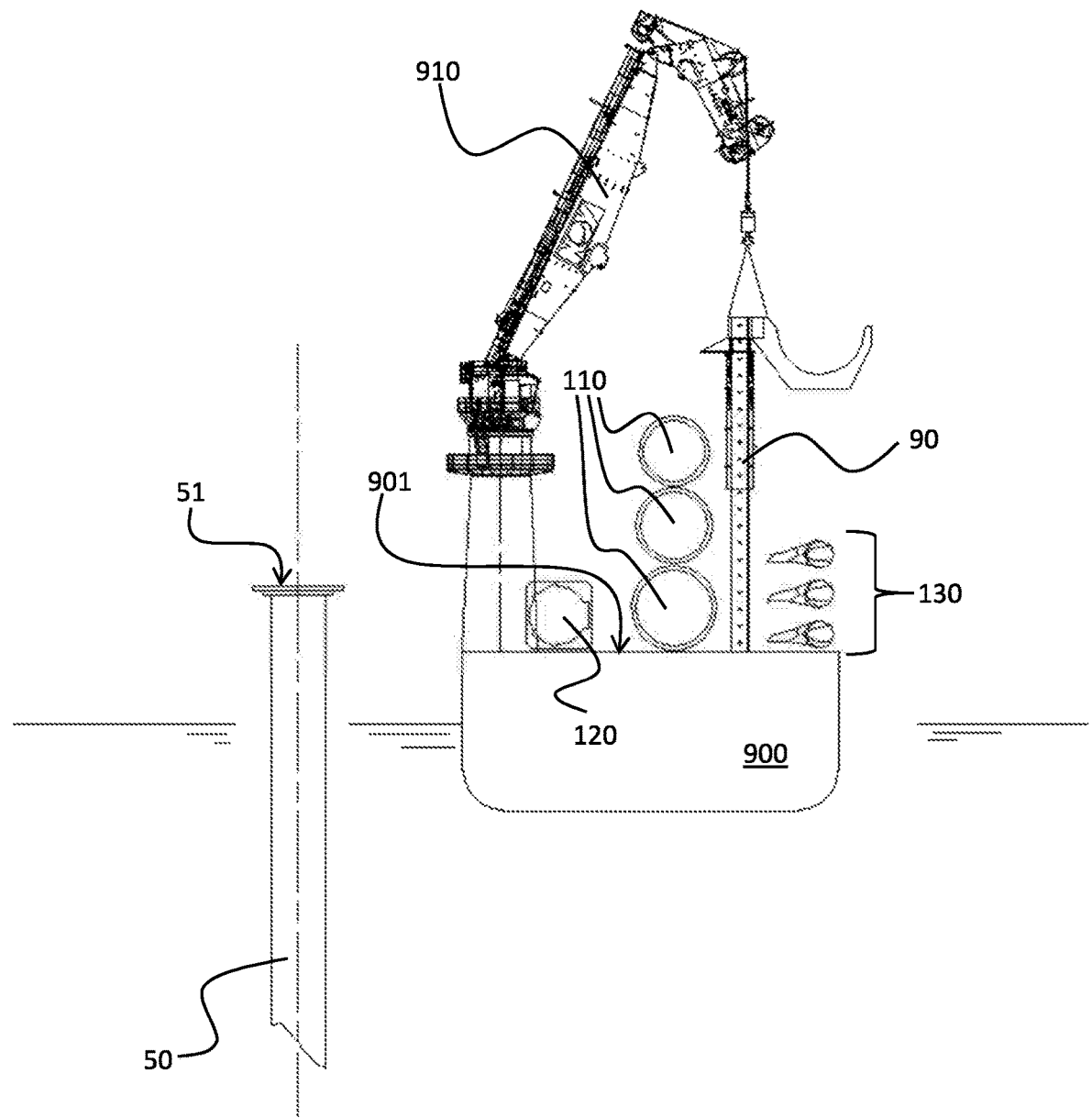
FIGS. 1 to 25 show different stages of an embodiment of the method of building an offshore windmill in accordance with this disclosure.

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIGS. 1 to 25 show different stages of an embodiment of the method of building an offshore windmill in accordance with this disclosure. FIG. 1 shows a first stage of this method. In this stage of the method there is provided a floating vessel 900, for instance an offshore crane ship. The vessel 900 has been provided with a 3D-heave compensated crane 910 on a deck 901 thereof. The 3D-heave compensated crane 910 is capable of lifting between 250 T or 400 T, for example. It is typically the windmill generator (nacelle), which is the heaviest part of the windmill assembly. A 6 MW nacelle/windmill generator (i.e. from RePower) typically weighs 316 T, so a 400 T crane will be able of installing most 6 MW nacelles and some 8 MW nacelles. A 5 MW nacelle (i.e. from Multibird) typically weighs 233 T, so a 250 T crane will be able to install most nacelle designs up to and including 5 MW.

The vessel 900 is provided with offshore windmill parts, including a plurality of windmill column parts 110, a windmill generator 120, and a plurality of windmill blades 130. It must be noted that there may be a collection of other smaller parts, which is needed for mounting, fixing and installing the parts together, but all these details have been omitted in order not to obscure this disclosure. In FIG. 1 the vessel 900 has transported the windmill parts close to an offshore windmill pedestal 50 in a sea 1, so close that the pedestal is within reach of the crane 910. In addition to the windmill parts the vessel 900 is also provided with a lifting jack 90, which plays an important role in the method of this disclosure. In the embodiment shown of FIGS. 1 to 25, the pedestal 50 has been provided with a so-called pedestal adaptor 51, which serves to cooperate with the lifting jack 90 as will be explained later.

Figure 2:
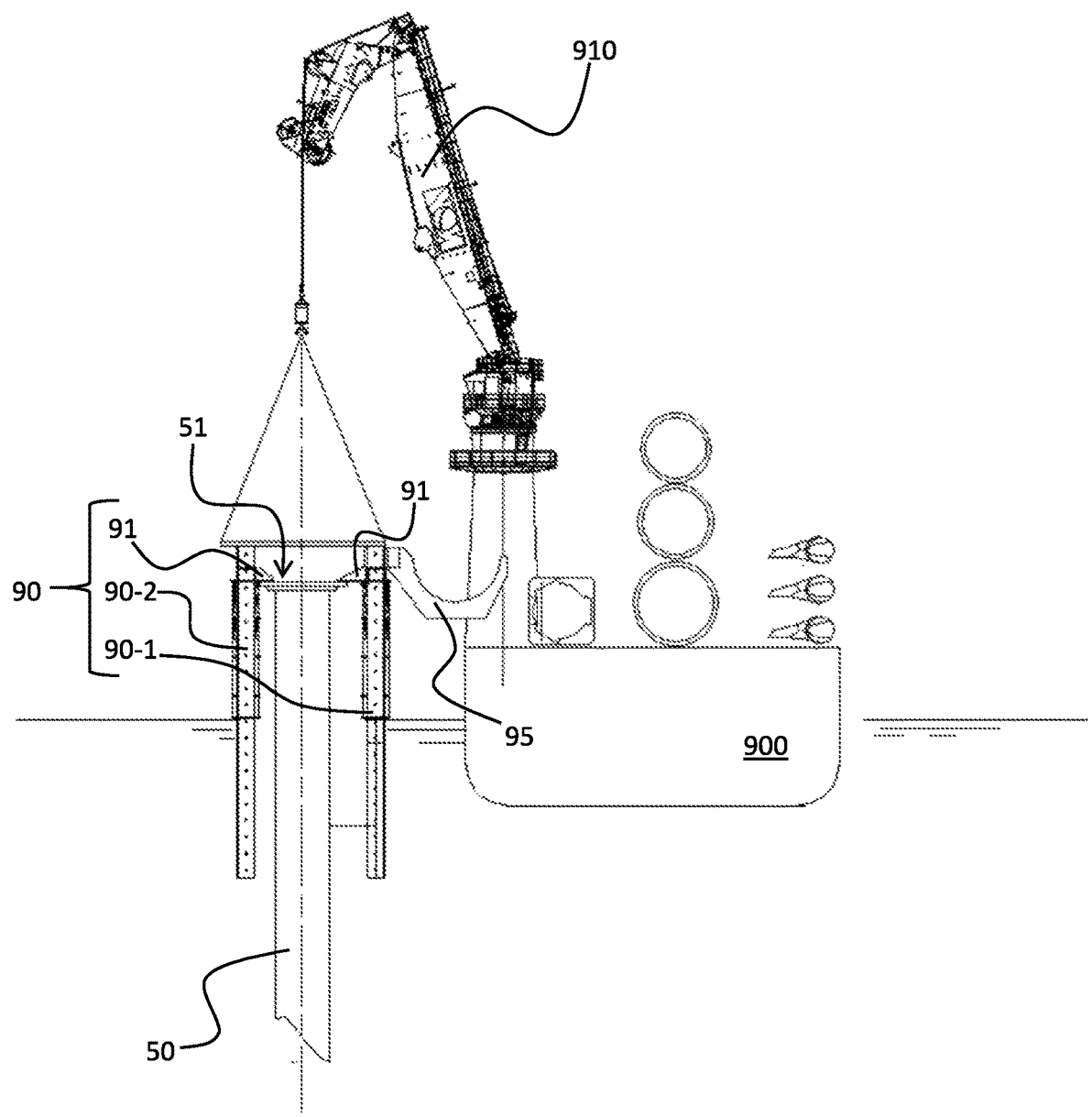

FIG. 2 shows another stage of the method of building an offshore windmill. In this stage of the method, the lifting jack 90 is placed directly on the pedestal 50 using the crane 910. The load on the crane is typically in the order of 200 T (depending on the size of the windmill that is built) and is lifted and moved to the pedestal 50 in 3D-advanced heave compensation (3D-AHC) mode. The lifting jack 90 comprises fixing members 91, which facilitate placing and fixing the lifting jack 90 to the pedestal 50 via the pedestal adaptor 51. It must be noted that there exist also other ways of temporarily mounting a lifting jack 90 to an existing pedestal 50, which may render the pedestal adaptor 51 superfluous. In the figure there is two lifting legs 90-1, 90-2 visible, but in this embodiment there are three, as will be discussed with respect to FIGS. 26-27. The lifting jack 90 further comprises a cradle 95 mounted to one of its lifting legs 90-1. As will be further explained with reference to other figures this cradle 95 is used to lift windmill parts up to the upper end of the lifting jack 90, but also to manipulate the orientation of said parts to facilitate the building of the windmill. The cradle 95 is configured to slide along the respective lifting leg 90-1.

Figure 3:
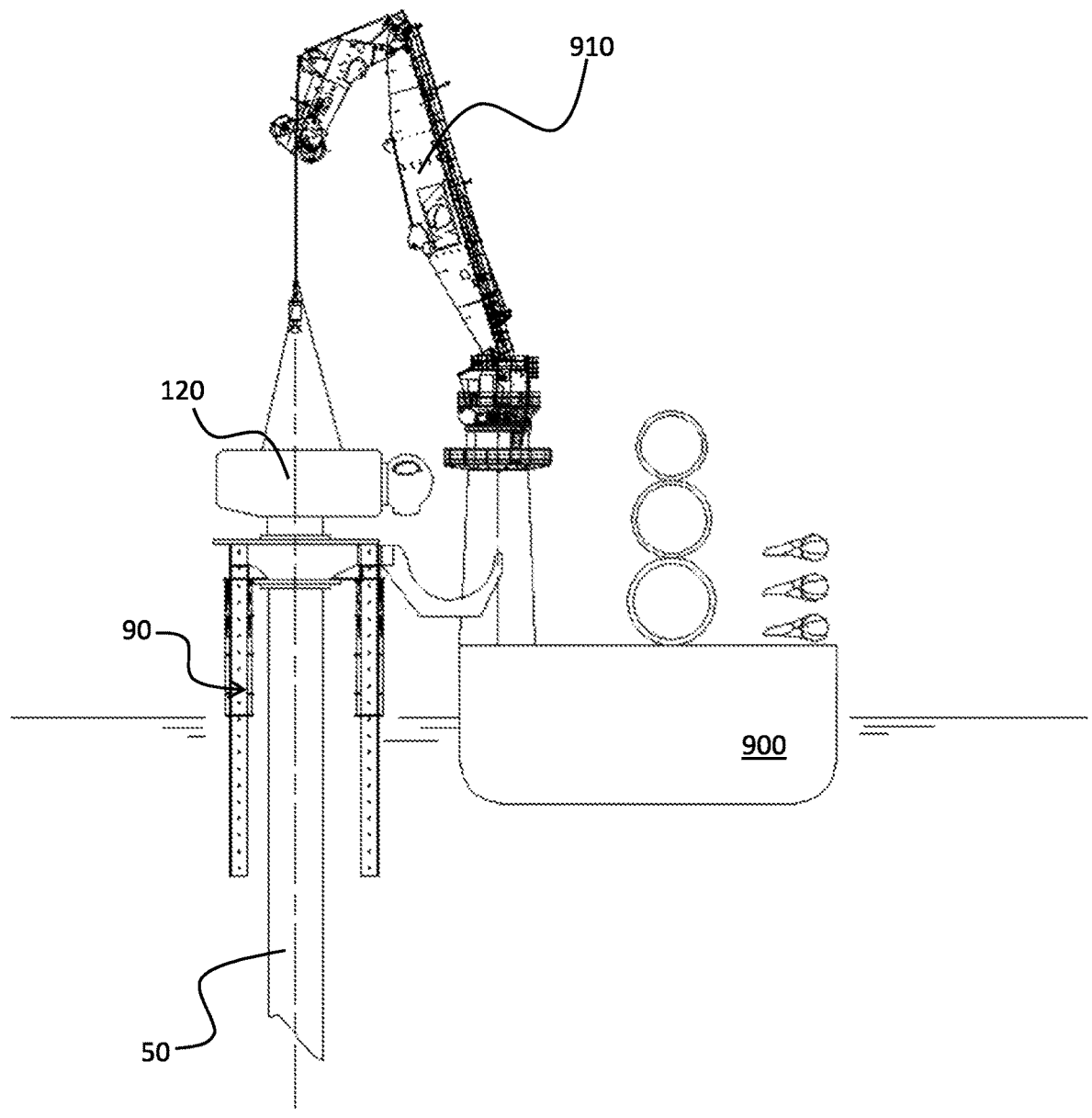

FIG. 3 shows another stage of the method of building an offshore windmill. In this stage of the method, the windmill generator 120 is lifted and moved to the pedestal 50 using the crane 910 in 3D-AHC mode. The typical load on the crane 910 is 200-300 T, depending on the size of the windmill that is built. In this embodiment the windmill generator 120 is secured (i.e. bolted) to the top side of the lifting jack 90 as illustrated.

Figure 4:
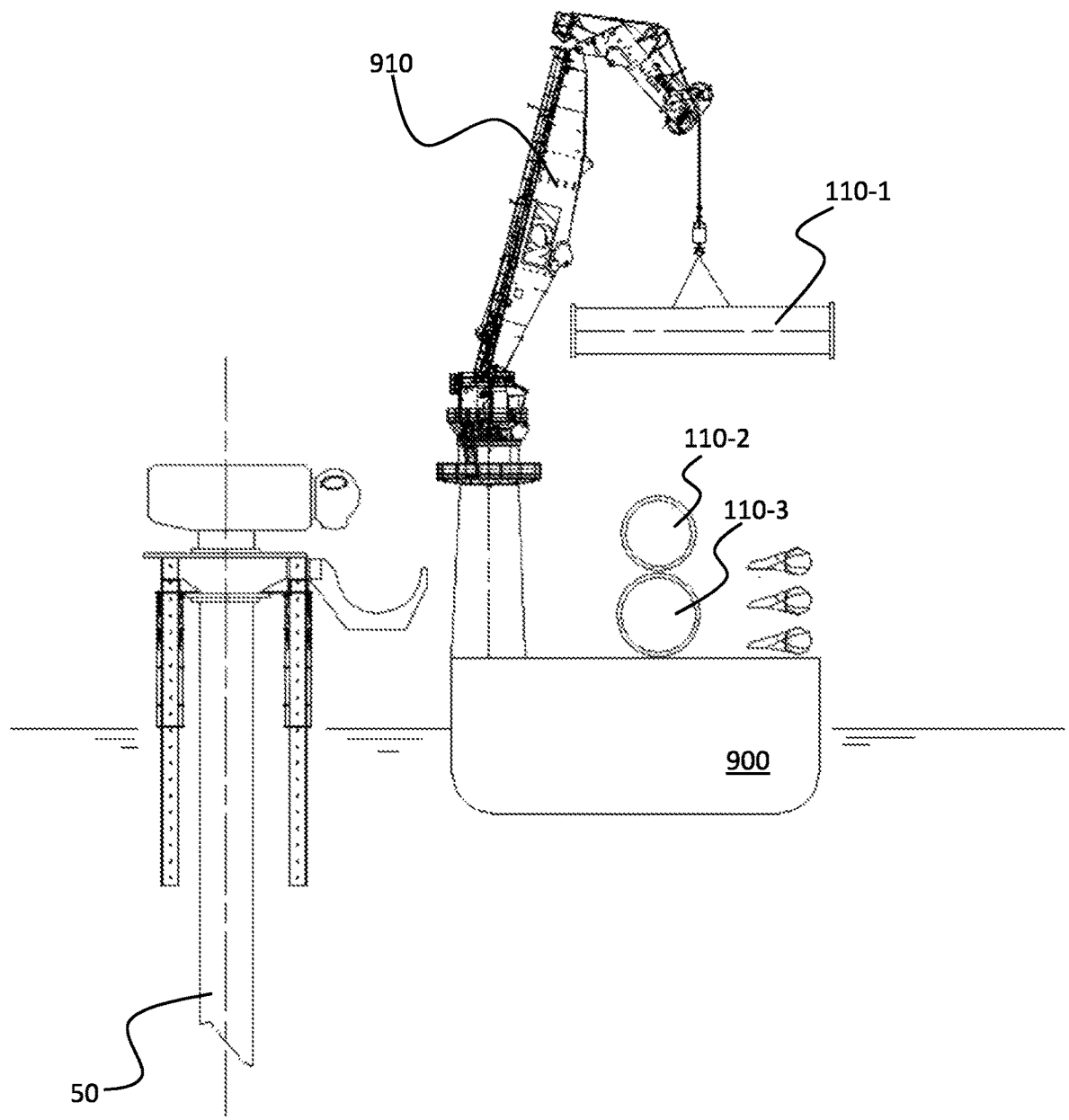

FIG. 4 shows another stage of the method of building an offshore windmill. In this stage of the method a first one 110-1 of the three windmill column parts 110-1, 110-2, 110-3 is lifted with the crane 910. The typical load on the crane 910 is 70-100 T, depending on the size of the windmill that is built.

Figure 5:
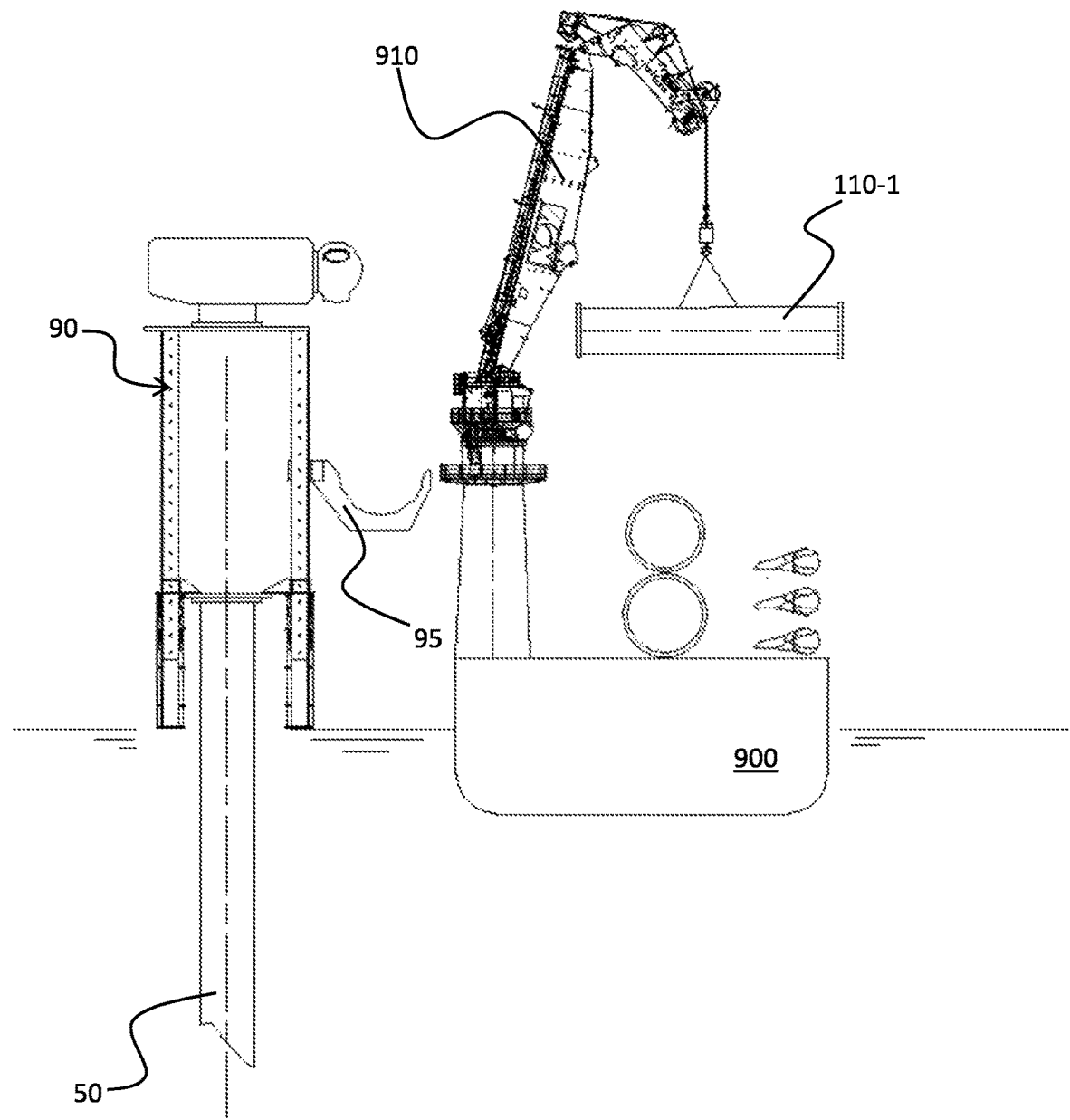

FIG. 5 shows another stage of the method of building an offshore windmill. In this stage of the method, the lifting jack 90 is run up to its top position. In addition, the cradle 95 is moved towards a position in between the two extreme positions (maximum extension and minimum extension) as illustrated.

The stages of FIGS. 4 and 5 can be easily exchanged, i.e. the lifting jack 90 can be run up before the first windmill column part 110-1 is lifted up by the crane 910.

Figure 6:
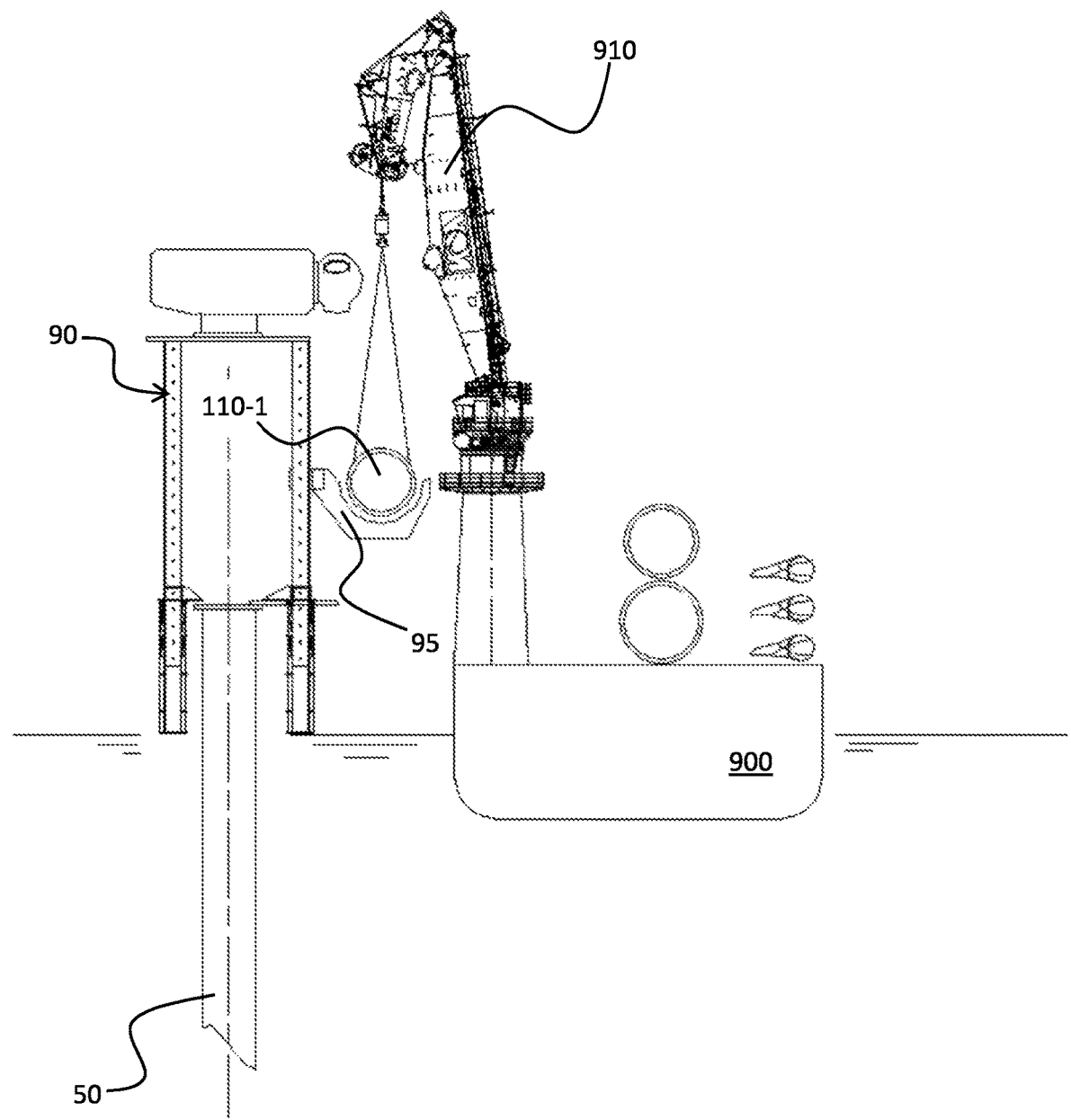

FIG. 6 shows another stage of the method of building an offshore windmill. In this stage of the method the first windmill column part 110-1 is moved to and placed on the cradle 95 (also referred to as catwalk) of the lifting jack 90 using the crane 910 in 3D-AHC mode.

Figure 7:
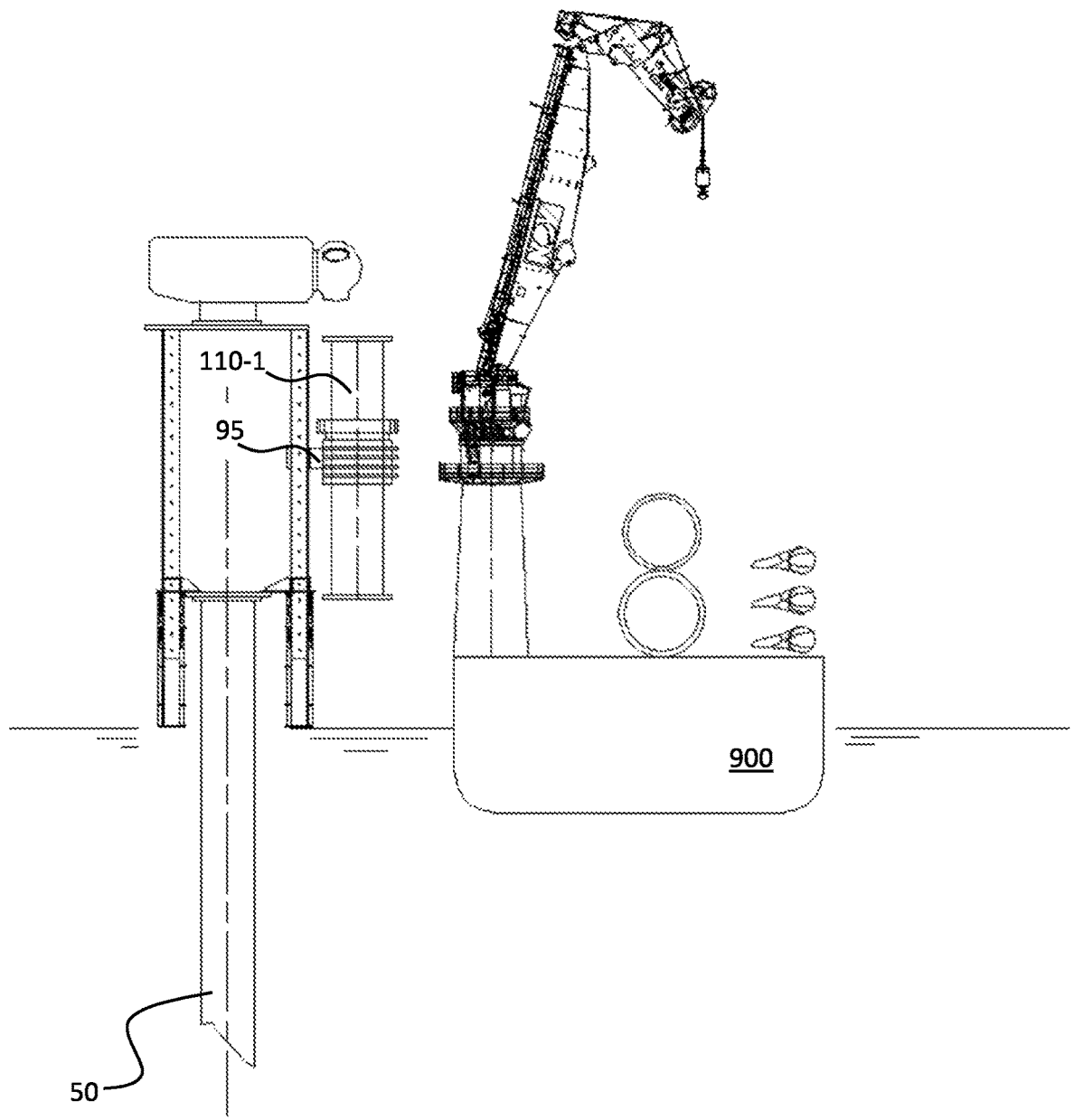

FIG. 7 shows another stage of the method of building an offshore windmill. In this stage of the method the first windmill column part 110-1 is clamped by the cradle 95 and rotated to a vertical position. More details about the cradle 95 to facilitate this are given with reference to FIGS. 26-27.

Figure 8:
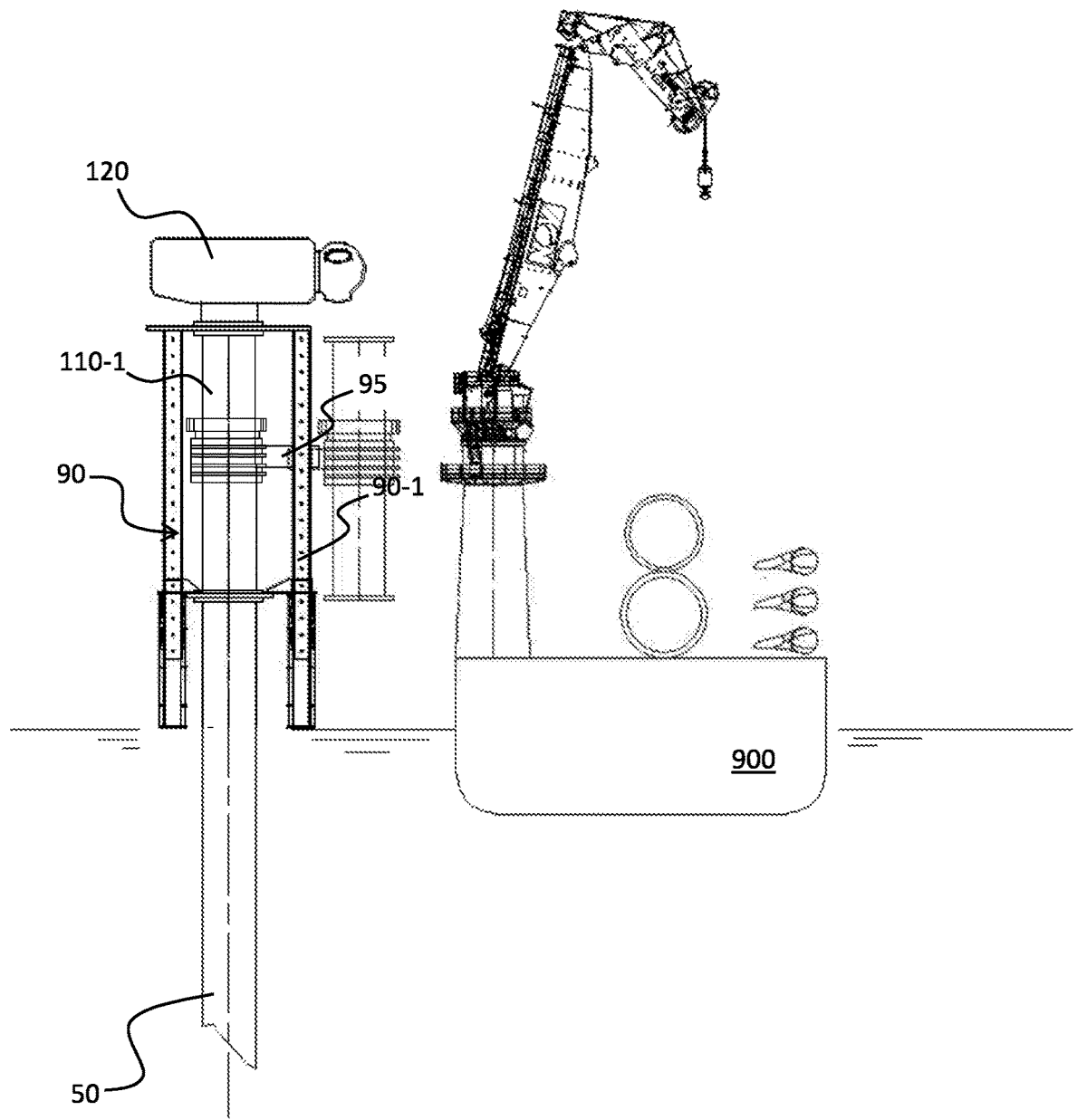

FIG. 8 shows another stage of the method of building an offshore windmill. In this stage of the method the cradle 95 rotates around the respective lifting leg 90-1 to which it is mounted swinging the respective first windmill column part 110-1 to the centre region of the lifting jack 90 in between the pedestal 50 and the windmill generator 120. Furthermore, the windmill generator 120 has been landed on the first windmill column part 110-1 by letting the lifting jack 90 descend a little bit. Subsequently, the windmill generator 120 has been secured to the respective windmill tower part 110-1.

Figure 9:
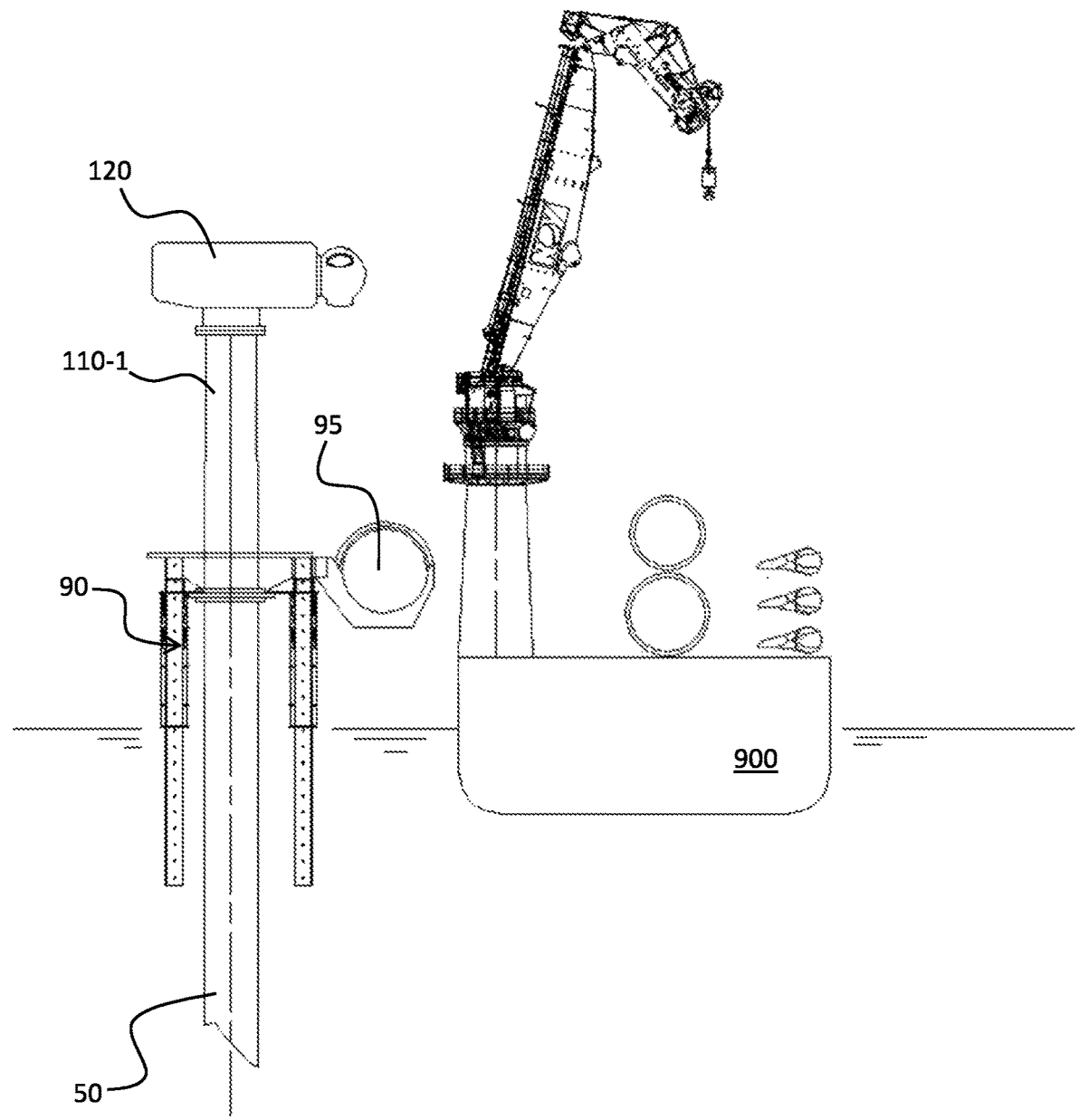

FIG. 9 shows another stage of the method of building an offshore windmill. In this stage of the method, the first windmill column part 110-1 has been released and the cradle 95 has been swung outward to the outside region as illustrated. Furthermore, the lifting jack 90 has been further lowered until the first windmill column part 110-1 has landed on the pedestal 50. The first column part 110-1 has been temporarily secured to the pedestal 50, i.e. it will be detached from it at a later stage of the method. Finally, the lifting jack 90 has been released from the windmill generator 120 and lowered as illustrated.

Figure 10:
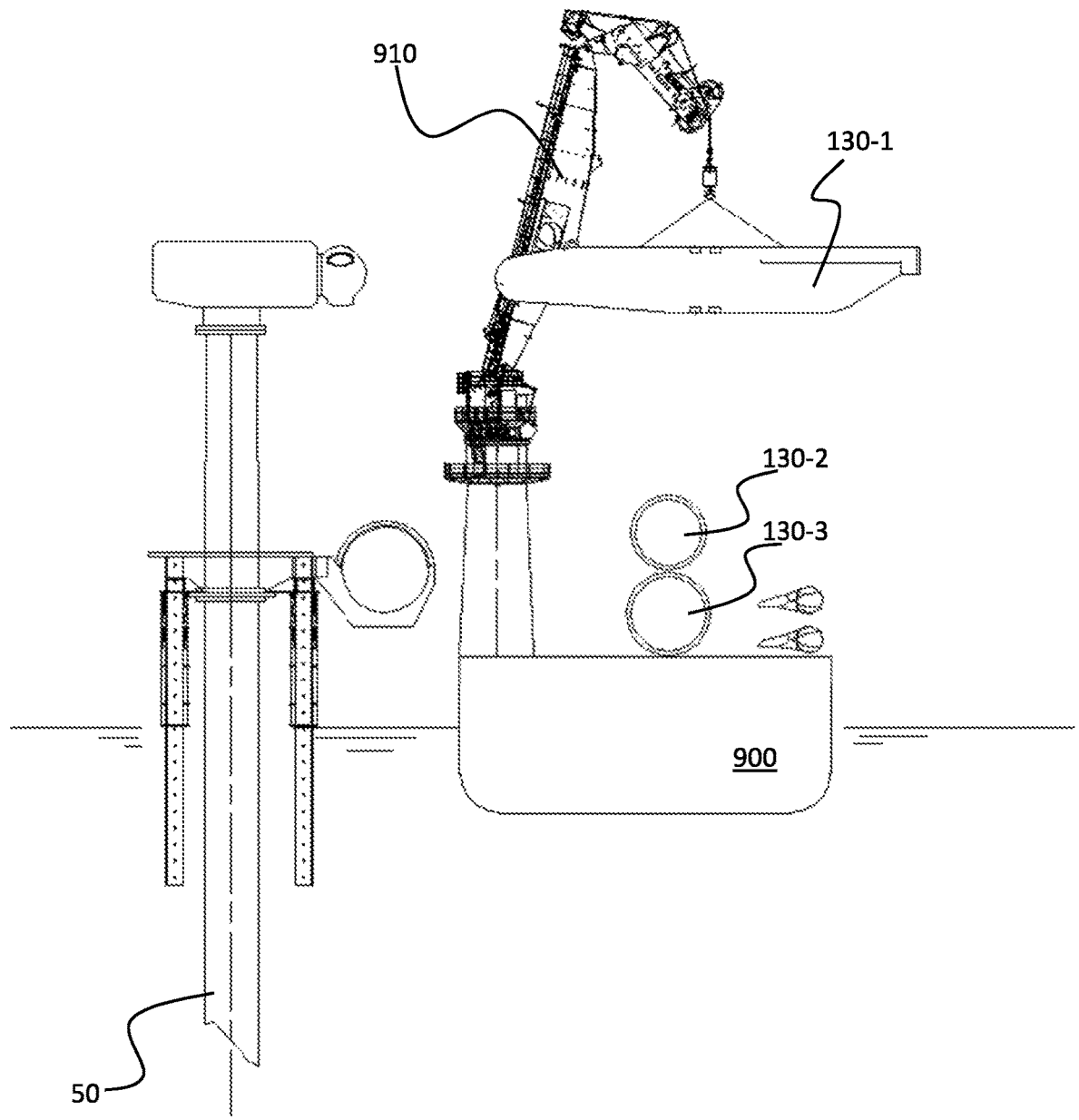

FIG. 10 shows another stage of the method of building an offshore windmill. In this stage of the method, a first one 130-1 of three windmill blades 130-1, 130-2, 130-3 is lifted using the crane 910 in 3D-AHC mode. The load on the crane in this stage is typically in the order of 15-35 T depending on the size of the windmill.

Figure 11:
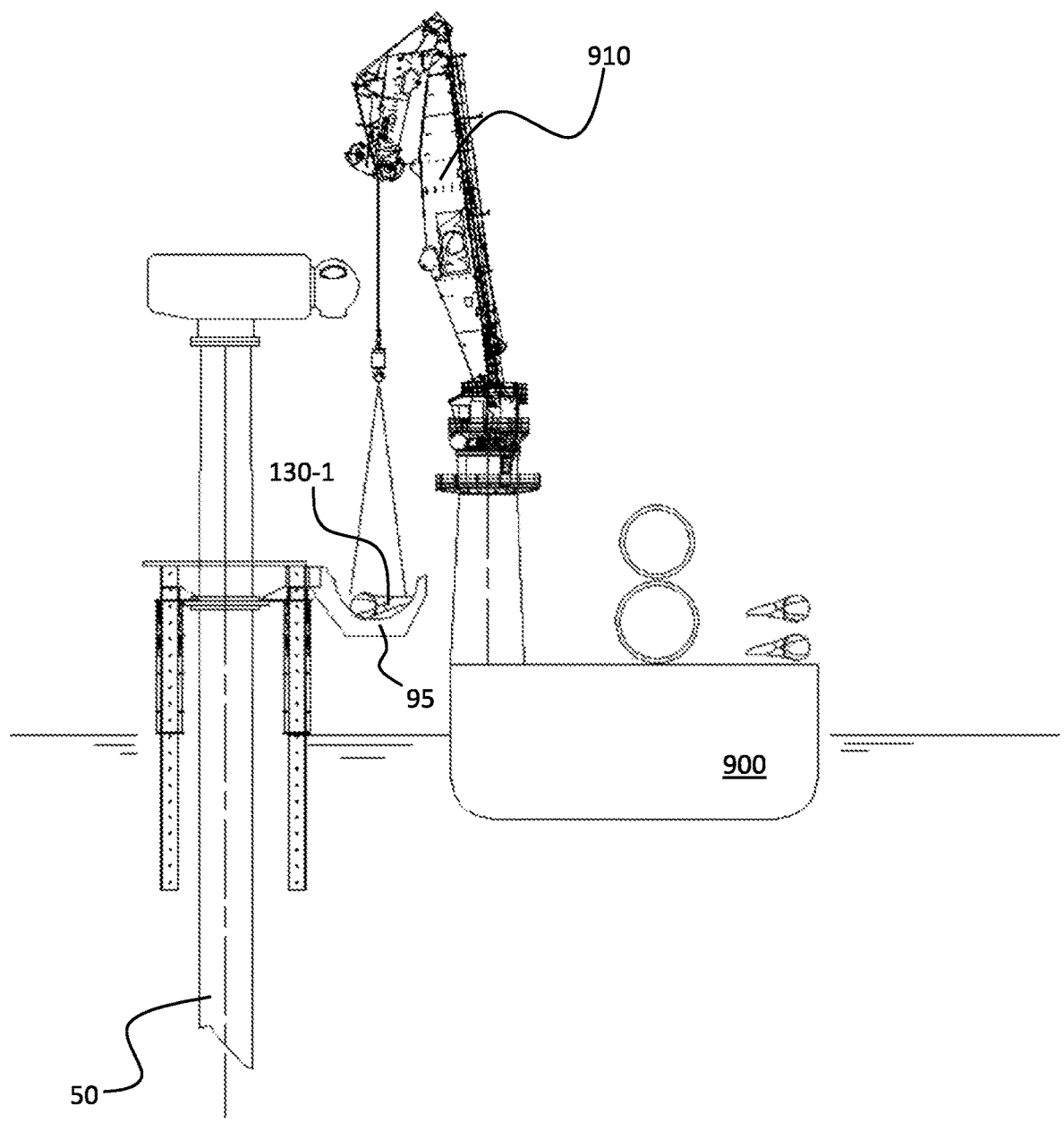

FIG. 11 shows another stage of the method of building an offshore windmill. In this stage of the method, the first windmill blade 130-1 is moved to and placed on the cradle 95 using the crane 910 in 3D-AHC mode.

Figure 12:
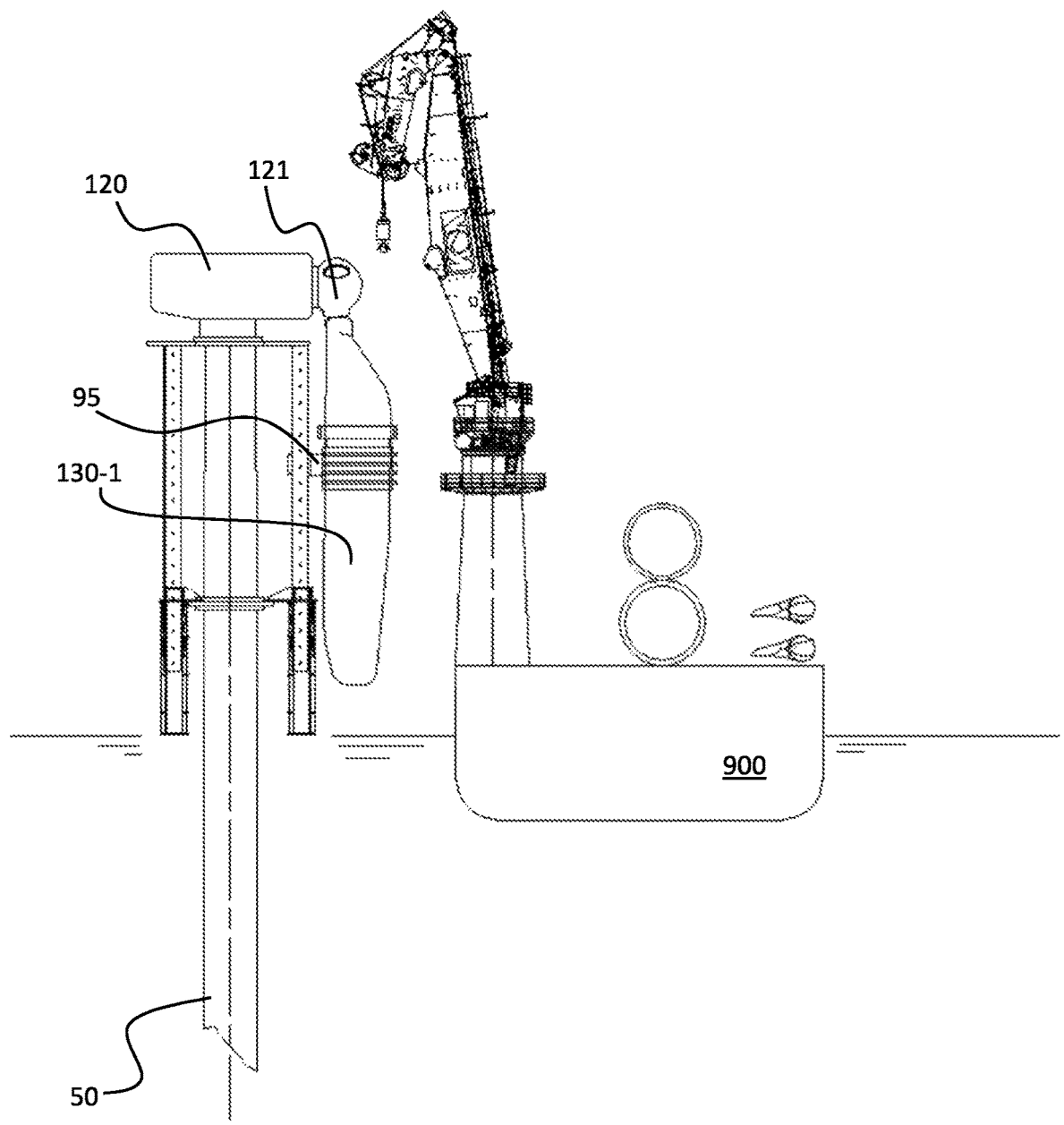

FIG. 12 shows another stage of the method of building an offshore windmill. In this stage of the method, the first windmill blade 130-1 has been secured to (clamped by) the cradle 95 and rotated to a vertical position as illustrated. Subsequently the cradle 95 is moved up so that the first windmill blade 130-1 is touching the hub 121 of the windmill generator 120. The first windmill blade 130-1 is then mounted to the hub 121.

Figure 13:
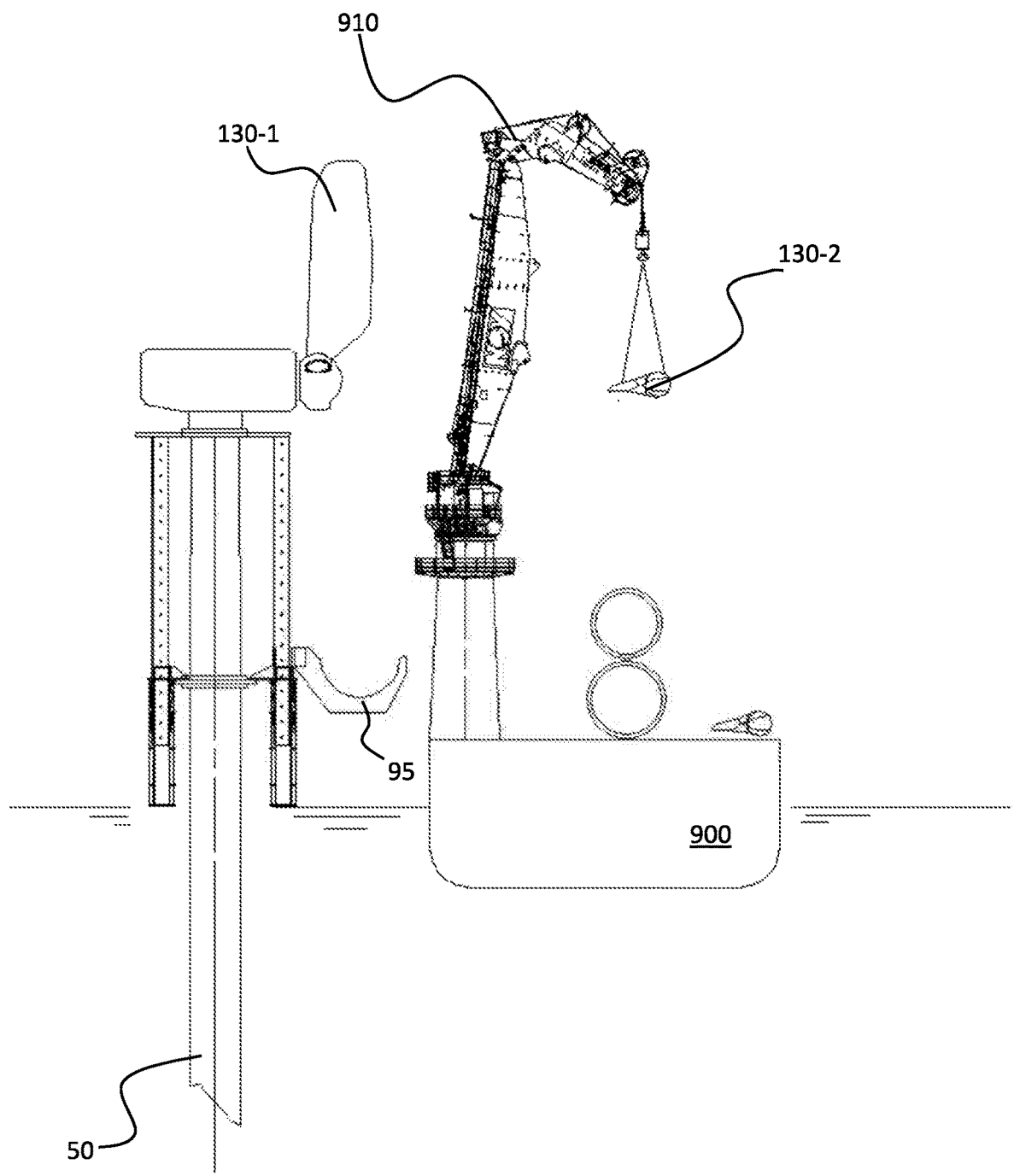

FIG. 13 shows another stage of the method of building an offshore windmill. In this stage of the method, the cradle 95 is opened (releasing the first windmill blade 130-1) and rotated back to its horizontal position. Furthermore, a second one 130-2 of the three windmill blades is lifted using the crane 910 in 3D-AHC mode. The load on the crane in this stage is typically in the order of 15-35 T depending on the size of the windmill. In addition, the hub 121 of the windmill generator 120 is rotated 120 degrees.

Figure 14:
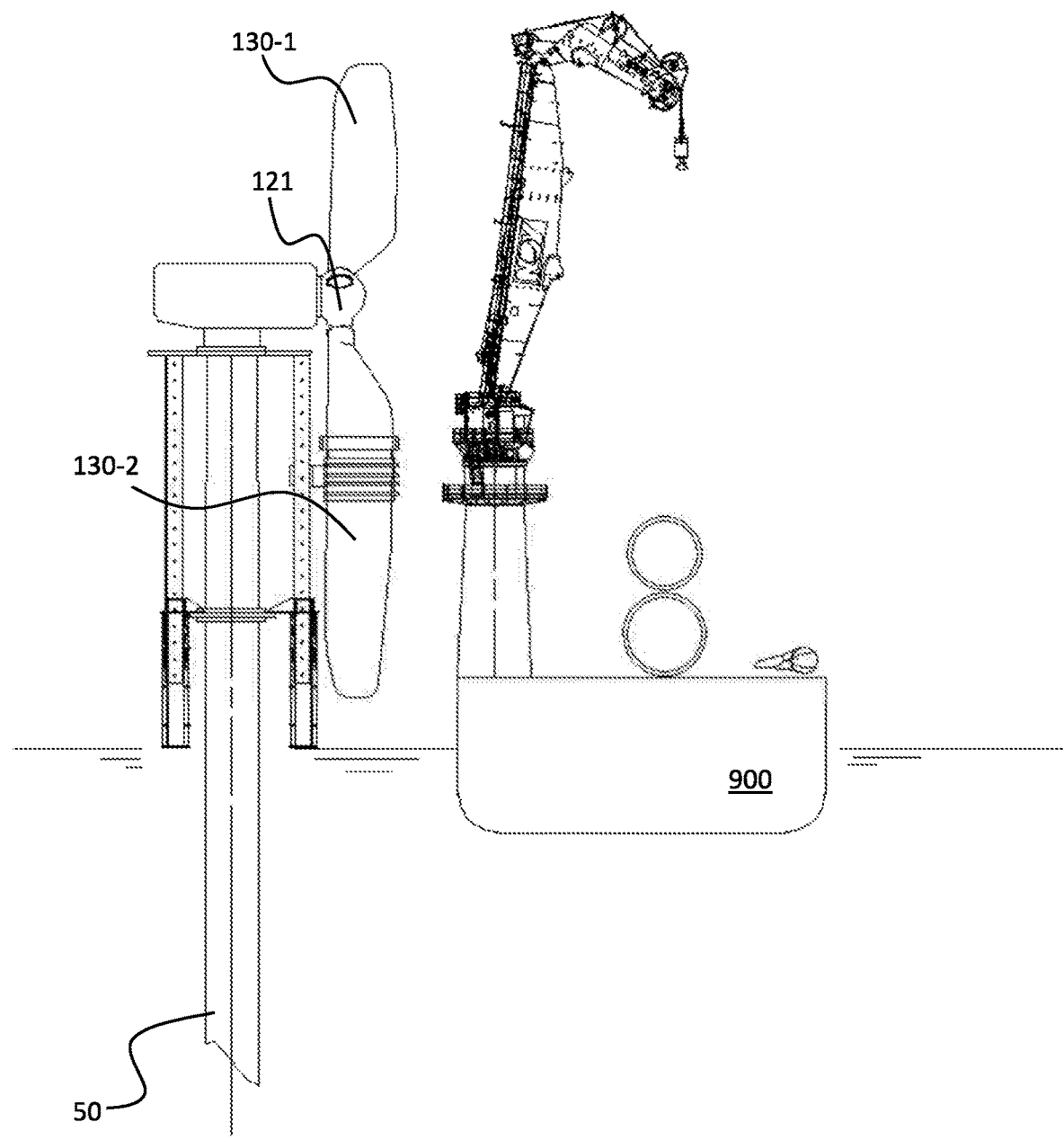

FIG. 14 shows another stage of the method of building an offshore windmill. In this stage of the method, the second windmill blade 130-2 is mounted to the hub 121 in a similar way as illustrated in FIGS. 11 to 13.

Figure 15:
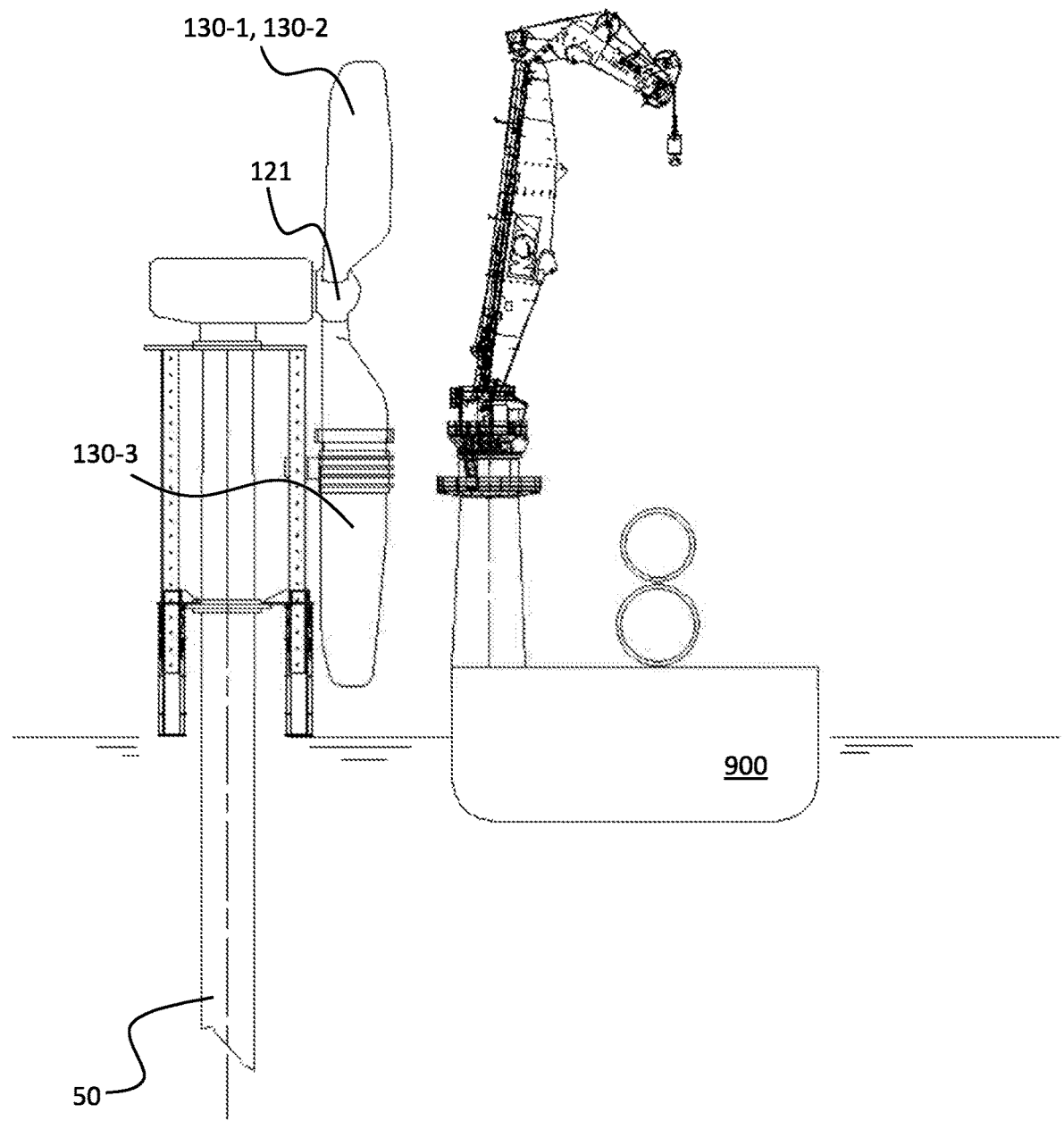

FIG. 15 shows another stage of the method of building an offshore windmill. In this stage of the method, the third windmill blade 130-3 is mounted to the hub 121 in a similar way as illustrated in FIGS. 11 to 13.

Figure 16:
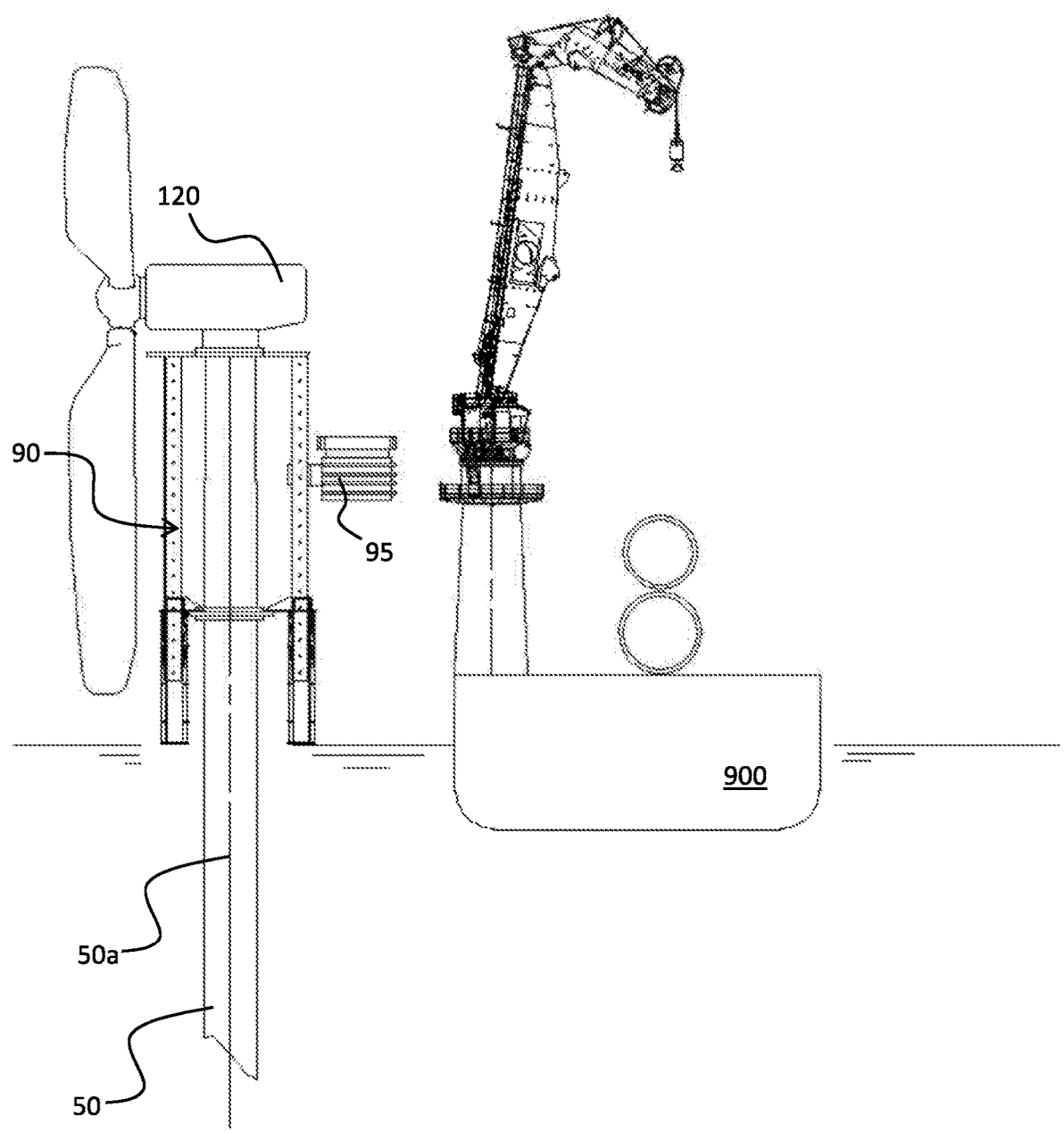

FIG. 16 shows another stage of the method of building an offshore windmill. In this stage of the method, the propeller is complete and the windmill generator 120 (also called Nacelle) is rotated 180 degrees around the pedestal axis 50a, such that the propeller of the windmill generator 120 is facing away from the vessel 900. This step creates the space for the further part of installation process, i.e. it substantially frees the cradle 95 of the lifting jack 90 for further lifting operations.

Figure 17:
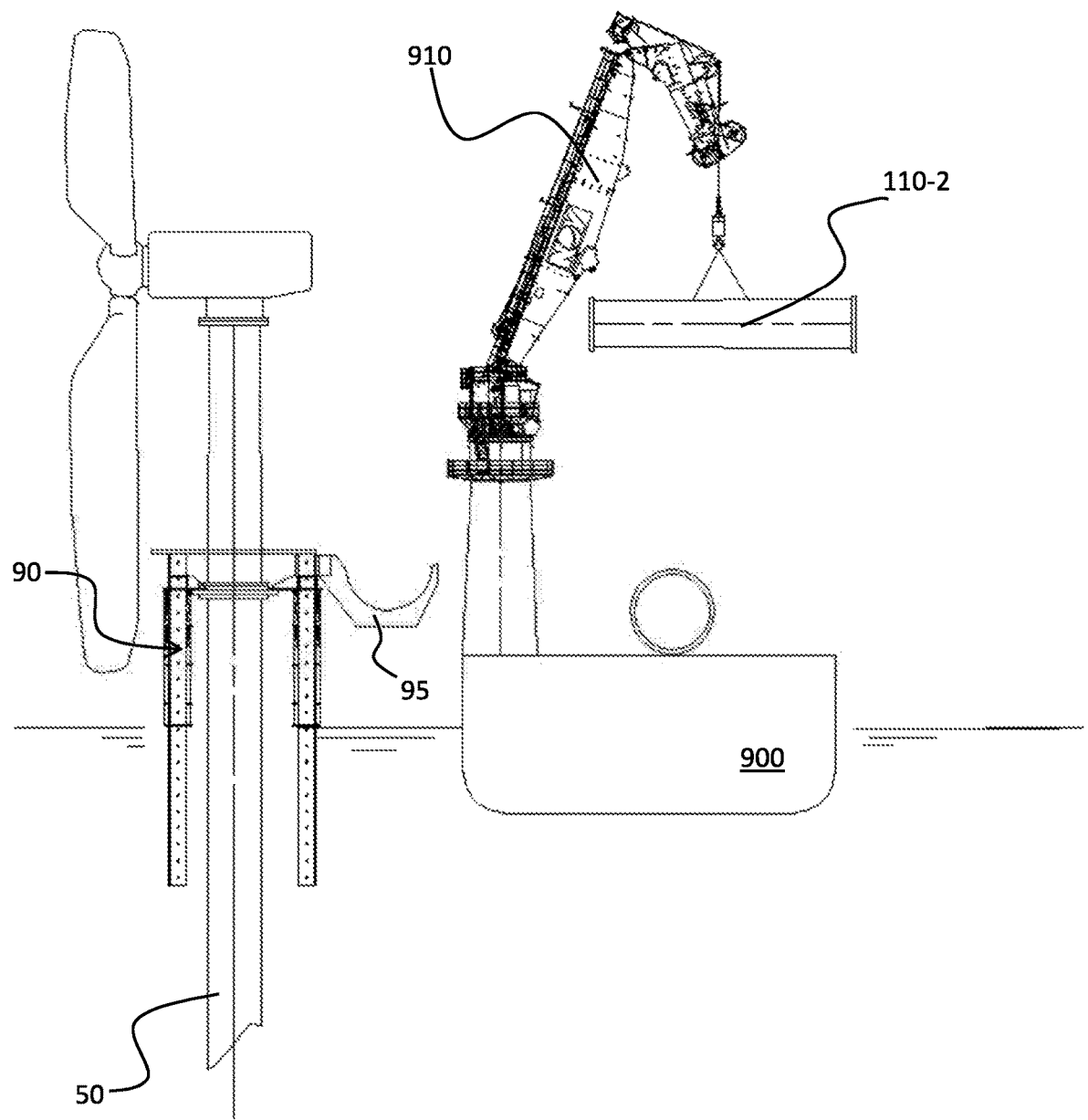

FIG. 17 shows another stage of the method of building an offshore windmill. In this stage the second windmill column part 110-2 is lifted from the vessel 900 using the crane 910 in 3D-AHC mode. The typical load on the crane 910 is 70-100 T, depending on the size of the windmill that is built. The cradle 95 is opened (its clamping arm is released and moved away) and moved to a lower end of the lifting jack 90.

Figure 18:
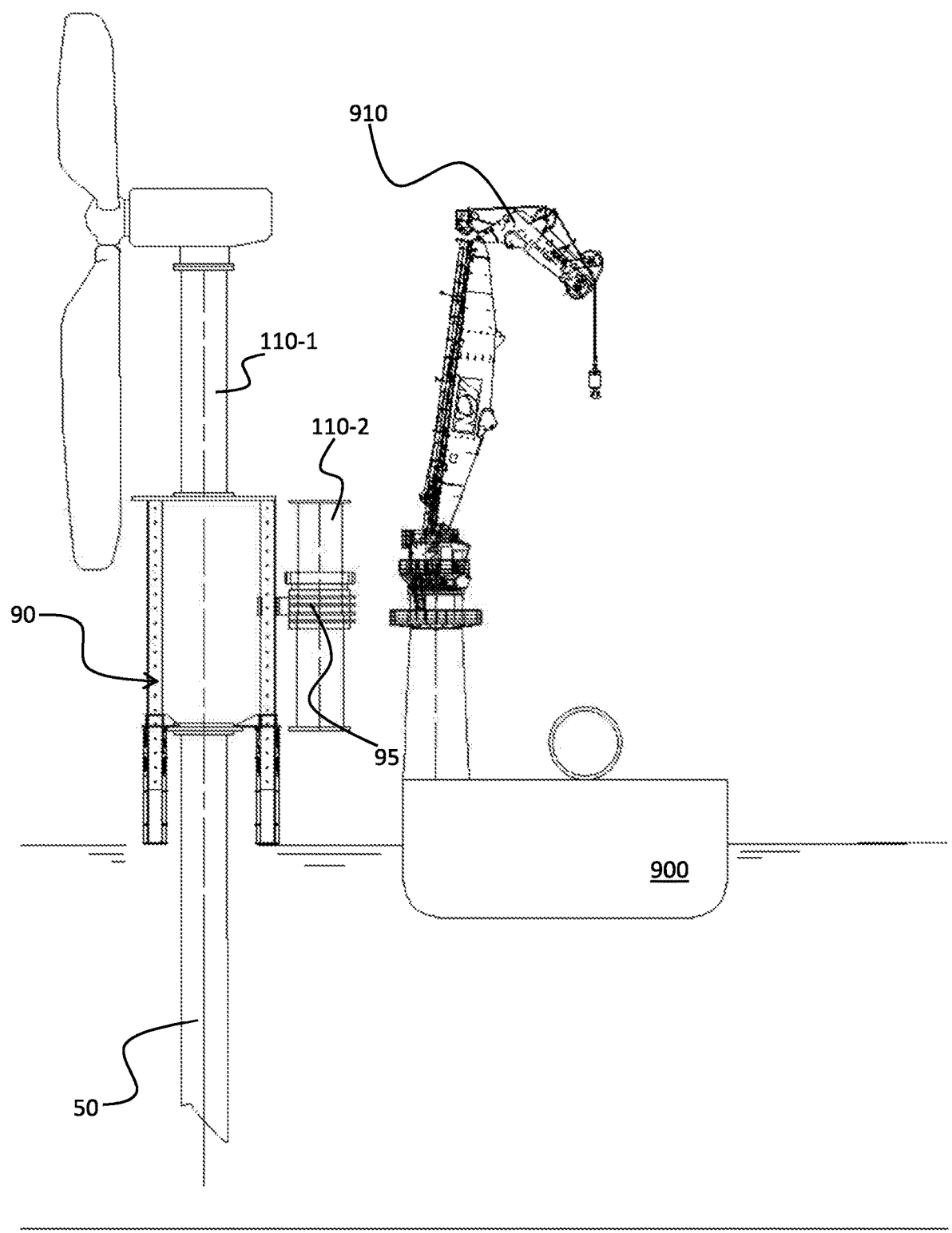

FIG. 18 shows another stage of the method of building an offshore windmill. In this stage of the method, the first windmill column part 110-1 is fixed to the lifting jack 90 and subsequently detached from the pedestal 50. The lifting jack 90 has been subsequently lifted (extended) and the cradle 95 is moved to a location in between said two end positions, Finally, the second windmill column part 110-2 has been moved to and placed on the cradle 95 using the crane 910 in 3D-AHC mode, which is then locked and rotated 90 degrees to bring the second windmill column in a vertical position.

Figure 19:
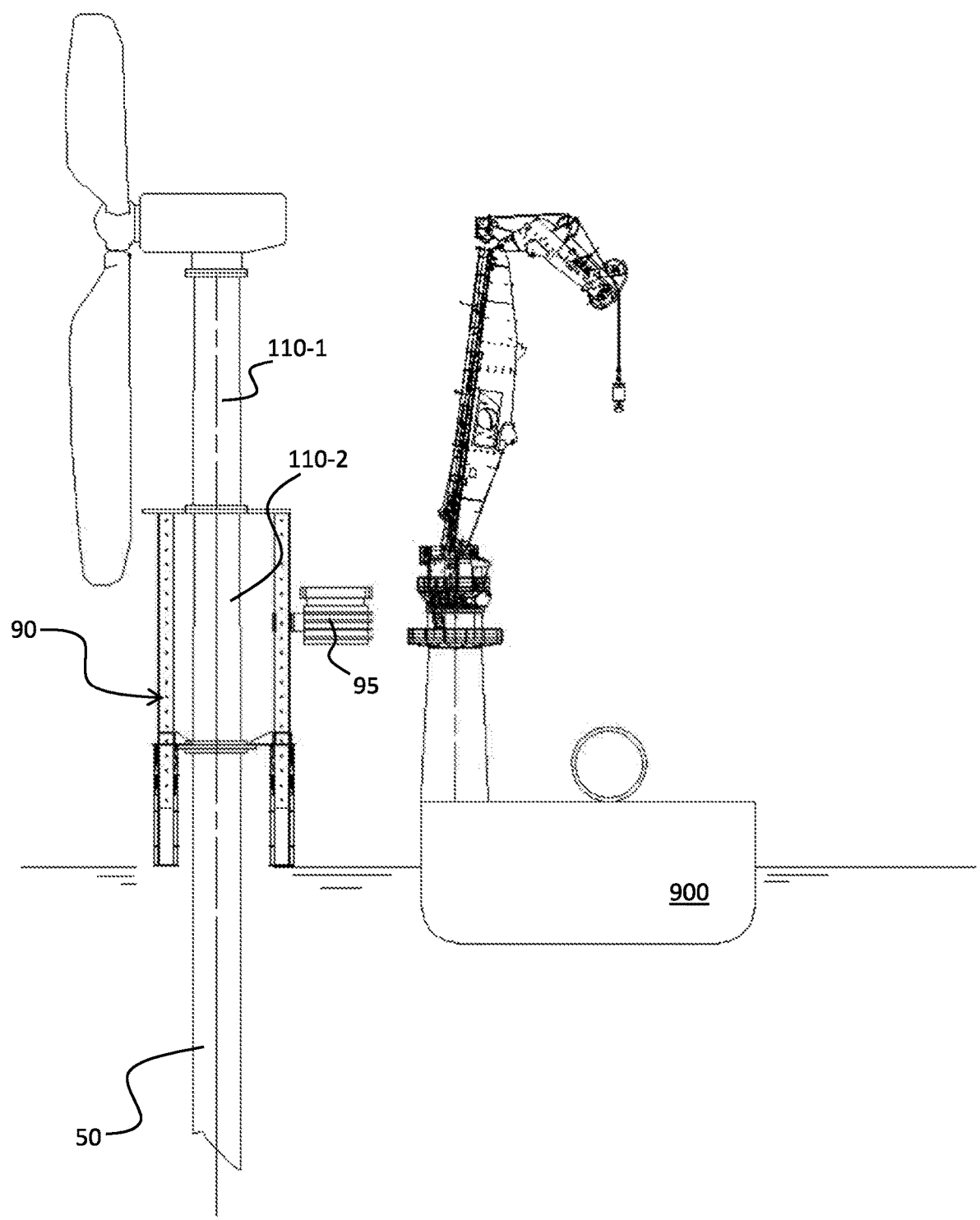

FIG. 19 shows another stage of the method of building an offshore windmill. In this stage of the method, the second windmill column part 110-2 has been rotated with the cradle 95 towards the centre region of the lifting jack 90 in between the pedestal 50 and the first windmill column part 110-1.

Figure 20:
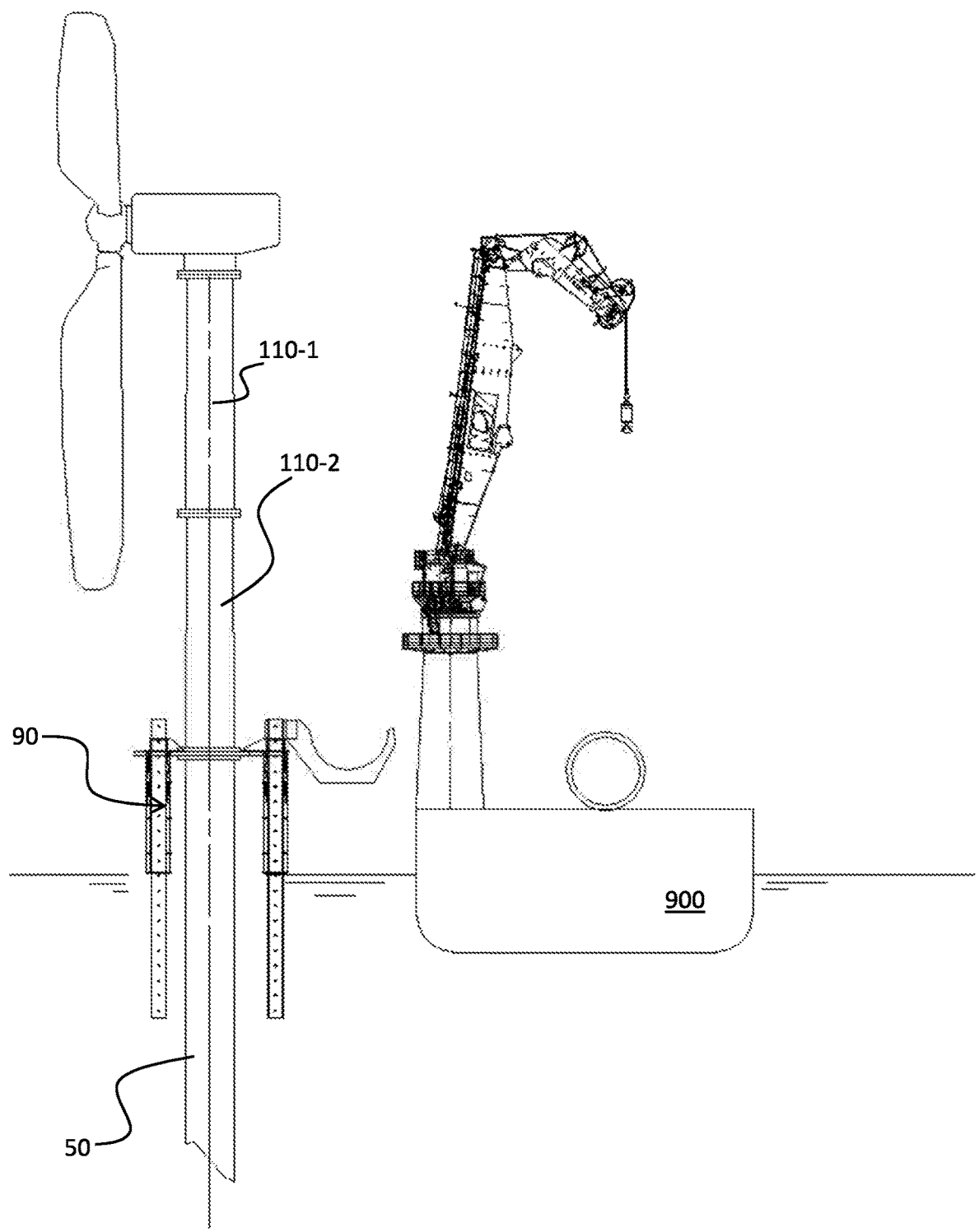

FIG. 20 shows another stage of the method of building an offshore windmill. In this stage of the method, the second windmill column part 110-2 is secured to the first windmill column part 110-1, and temporarily secured to the pedestal 50. Subsequently, the lifting jack 90 is retracted.

Figure 21:
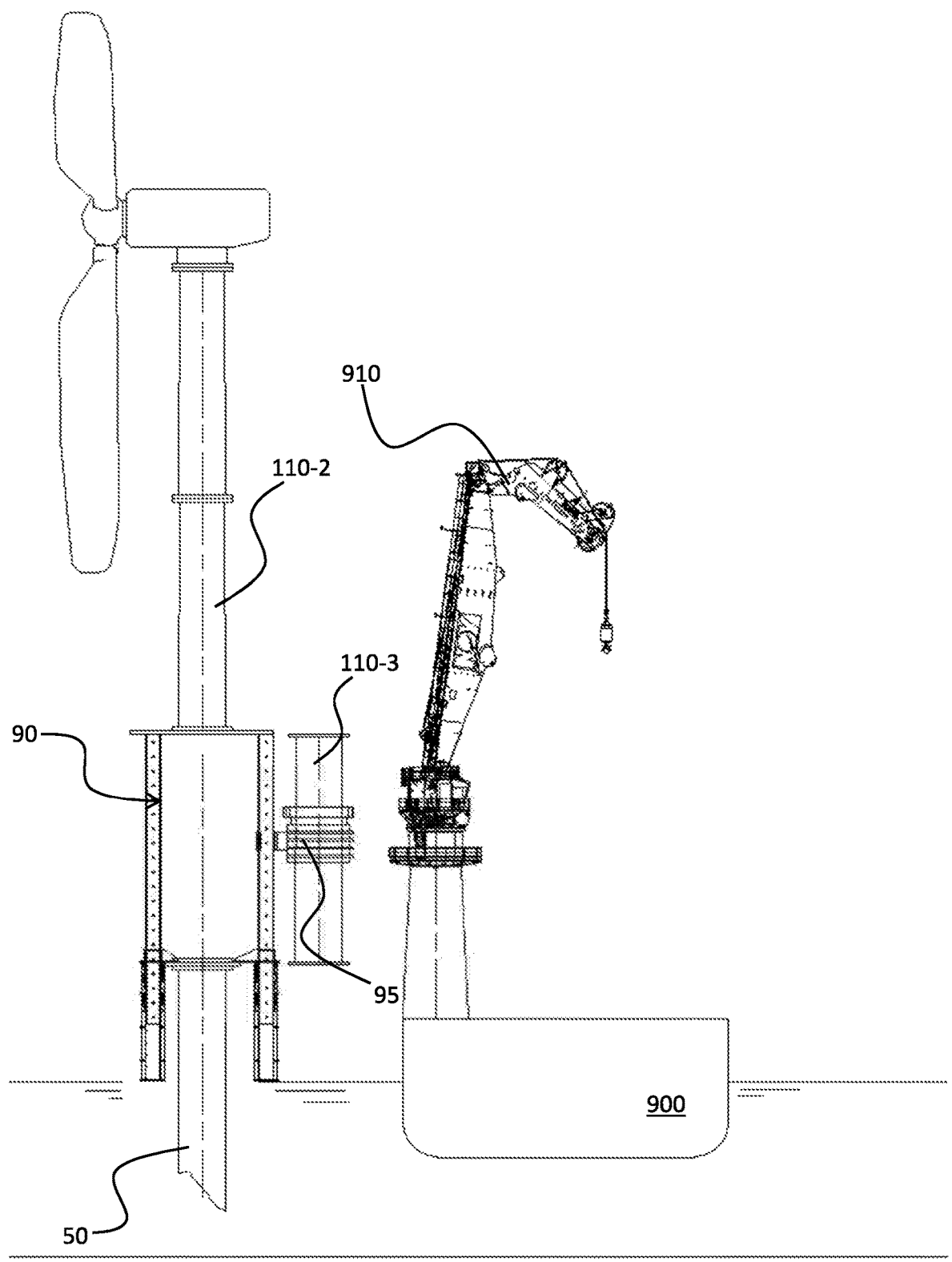

FIG. 21 shows another stage of the method of building an offshore windmill. In this stage of the method, the lifting jack 90 has been coupled to a lower end of the second windmill column part 110-2, and the second windmill column part 110-2 has been subsequently detached from the pedestal 50. Finally, the lifting jack 90 is lifted to its maximum height, the third windmill column part 130-3 has been lifted, moved to and placed in the cradle 95 (using the crane 910 in 3D-AHC mode), locked, and rotated, similar to as discussed with reference to previous figures.

Figure 22:
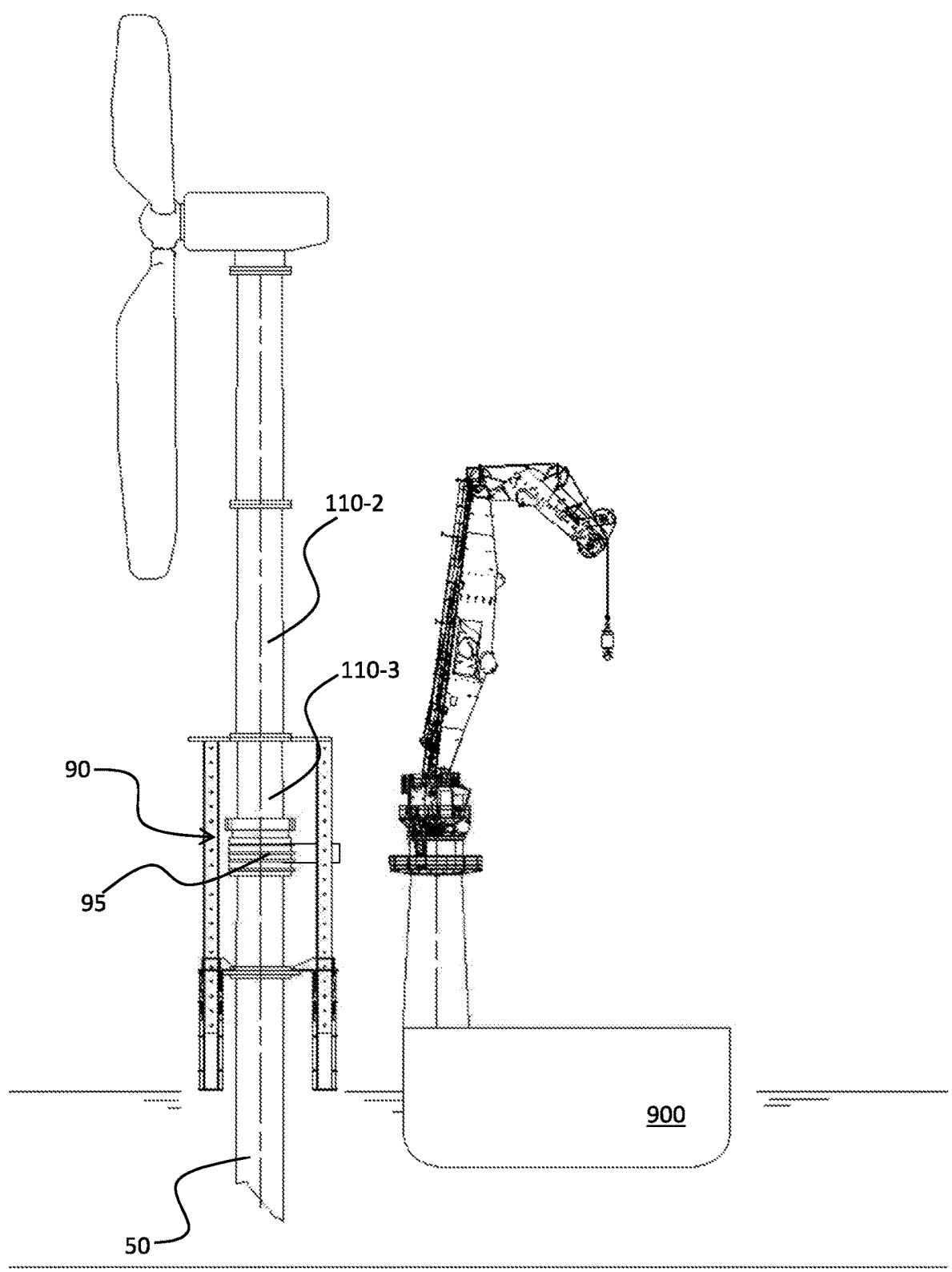

FIG. 22 shows another stage of the method of building an offshore windmill. In this stage of the method, the third windmill column part 110-3 has been rotated with the cradle 95 towards the centre region of the lifting jack 90 in between the pedestal 50 and the second windmill column part 110-2. The third windmill column part 110-3 is secured to the second windmill column part 110-2, and to the pedestal 50.

Figure 23:
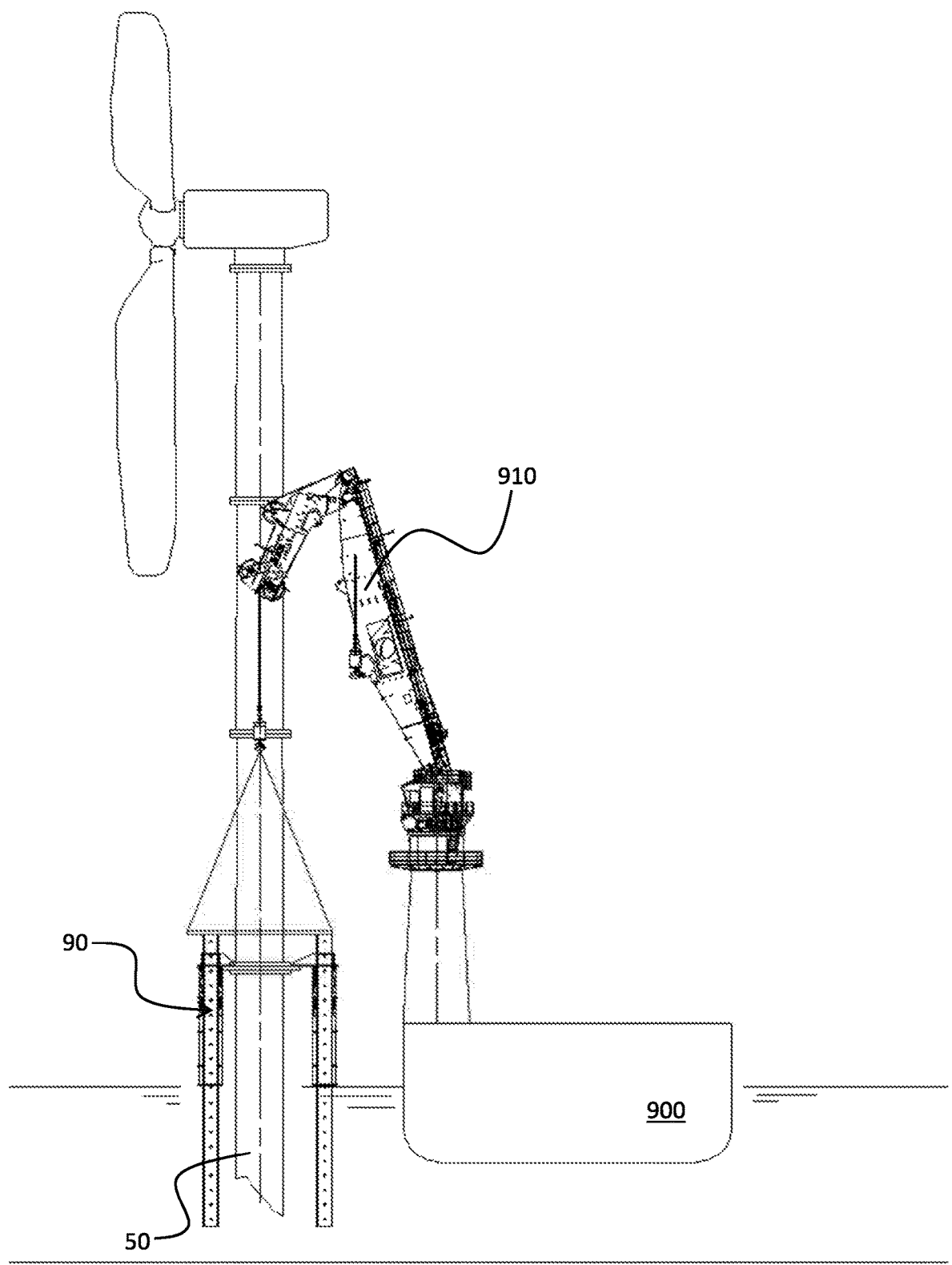

FIG. 23 shows another stage of the method of building an offshore windmill. In this stage of the method, the lifting jack 90 has been retracted, detached from the windmill, and is about to be removed (lifted up) by the crane 910 in 3D-AHC mode. The load on the crane 910 is typically in the order of 200 T (depending on the size of the windmill that is built).

Figure 24:
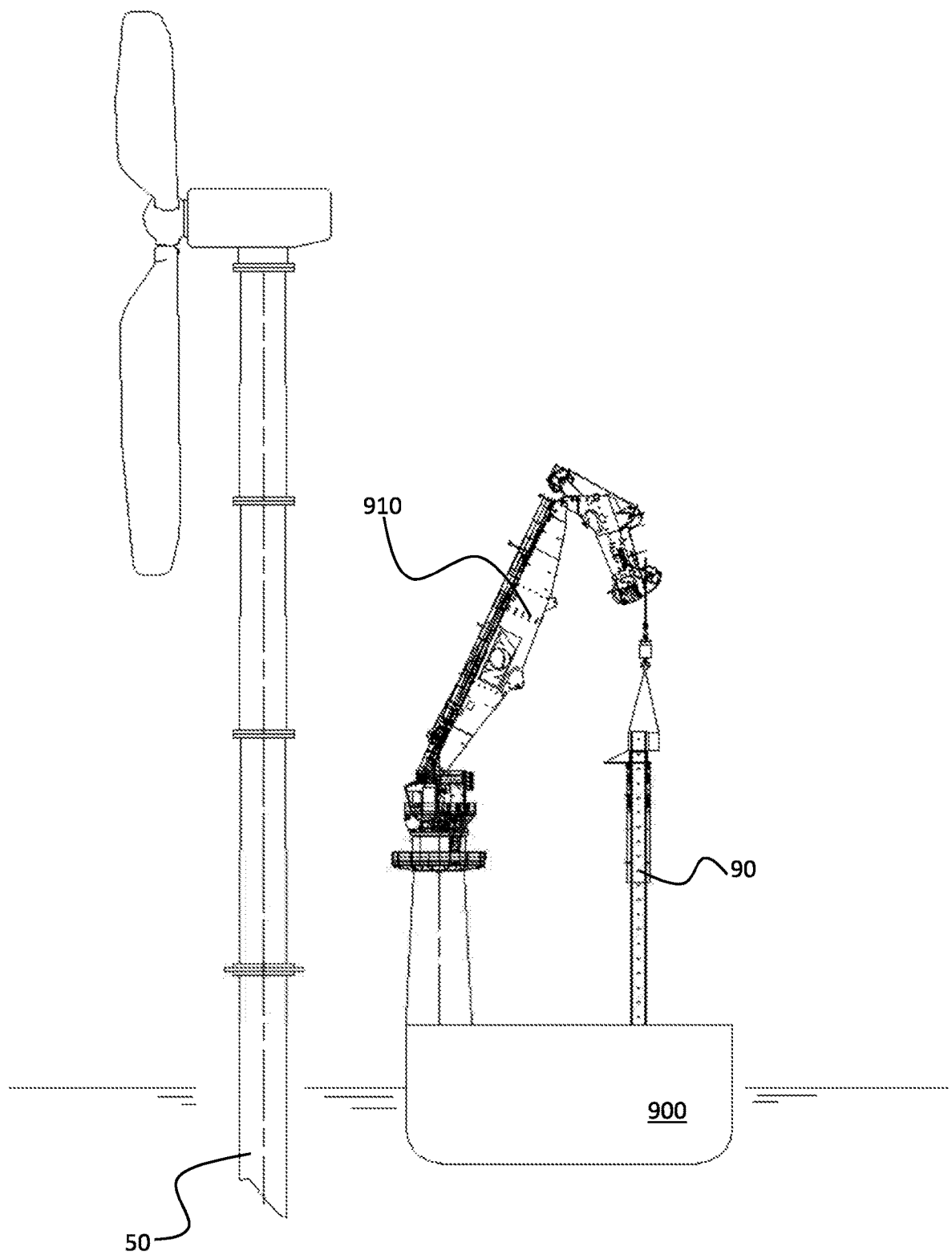

FIG. 24 shows another stage of the method of building an offshore windmill. In this stage of the method, the lifting jack 90 has been removed and placed on the vessel 900 by the crane 910. Subsequently, the lifting jack 90 is to be prepared for the next windmill.

Figure 25:
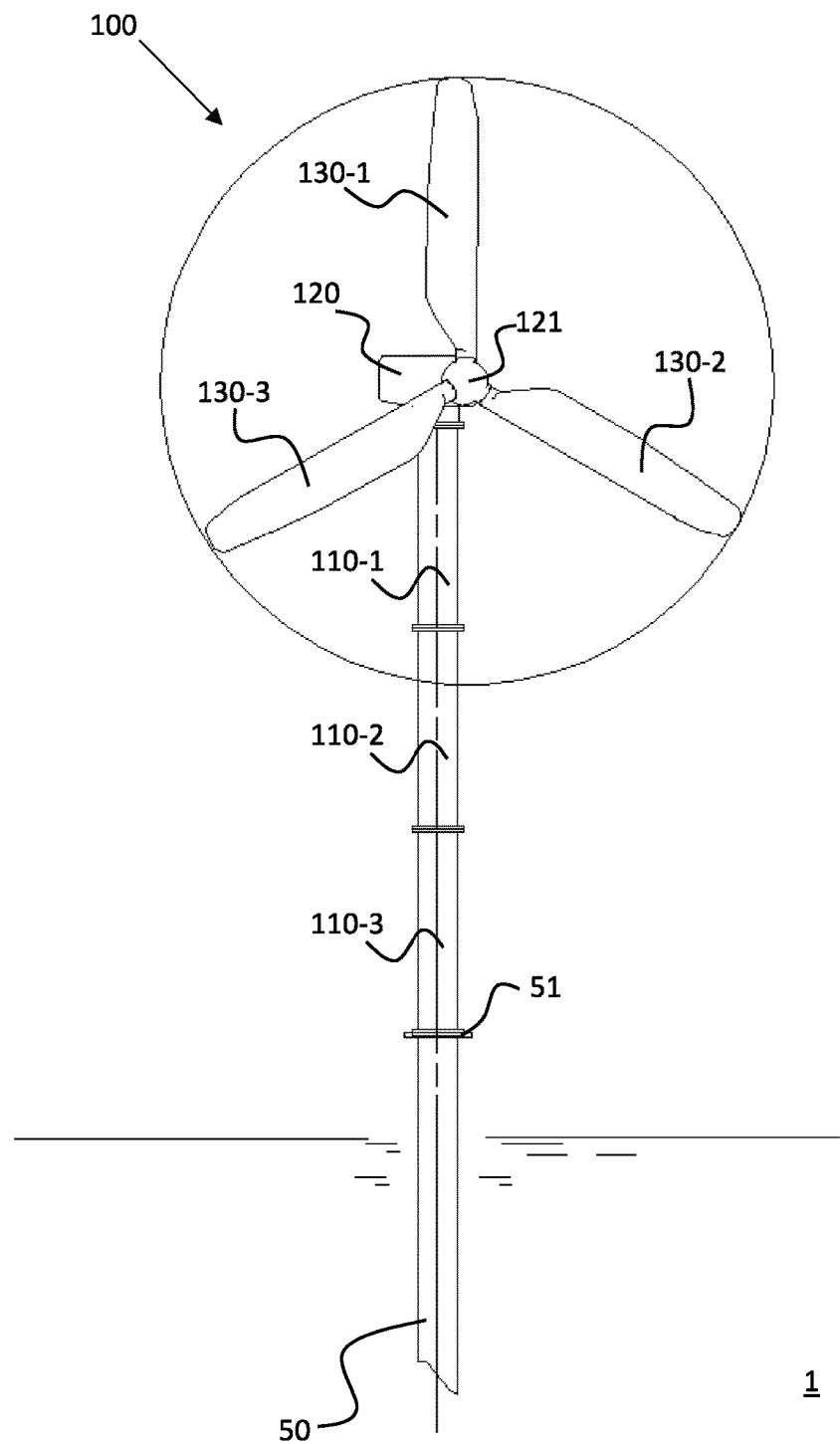

FIG. 25 shows another stage of the method of building an offshore windmill. In this stage of the method, the offshore windmill 100 has been completed.

It has already been mentioned that in an advantageous embodiment of the method of this disclosure an enhanced lifting jack 90 is provided, having extra functionality besides the basic jacking function. This enhanced lifting jack 90 comprises a cradle 95 that is configured for i) receiving respective windmill parts, for ii) bringing said parts (in a horizontal position) from a lower end of the lifting jack to an upper end of lifting jack for iii) manipulating, i.e. rotating, said parts to a vertical position, where necessary, and for iv) bringing said parts to said receiving region. It has to be noted that the cradle 95 is advantageous, but not essential to this disclosure. Its function could be taken up by the crane, albeit that the crane then needs to be modified such that it can handle, hold and manipulate parts. Expressed differently, the crane needs to be turned into some sort of robot arm.

FIG. 26a shows a top view of an embodiment of the advanced lifting jack 90 in accordance with this disclosure, wherein the lifting jack is in an open position. FIG. 26b shows a top view of the lifting jack of FIG. 26a, wherein the lifting jack is in a closed position. In these figures it is illustrated how the lifting jack 90 can be folded around an existing tubular structure if necessary. These figures also serve to illustrate how the earlier discussed fixing members 91 can be placed on the pedestal adaptor 51 as illustrated.

The cradle 95 in this embodiment comprises effectively two receiving members 95-2 in order to receive the parts in a stable manner.

FIG. 27 shows a more detailed top view of the lifting jack of FIG. 26b, wherein the cradle 95 is swung from an outer position to a centre position. A first feature that is illustrated in FIG. 27 are the locking members 96 that cooperate with the receiving members 95-1, 95-2 for holding/clamping respective parts. It must be noted that in FIG. 27 the cradle 95 in FIG. 27 has been rotated 90 degrees (for manipulating the respective part to a vertical position). Furthermore, the cradle 95 has been illustrated in four different swing positions, wherein it is visible that the cradle 95 may effectively swing in between said first 90-1 and third lifting leg 90-3 of the lifting jack 90 towards the centre region.

The method as illustrated in FIGS. 1 to 26 is just one of the many possible embodiments. There are many variations on the embodiments possible, which has been extensively discussed above.

In a further variation there is no cradle 95 on the lifting jack 90 as discussed with regards to FIGS. 26a, 26b and 27 earlier.

For instance, it must be noted that the lifting jack 90 in FIG. 2 may be provided after provision of the first windmill column part 110-1. As illustrated in FIGS. 26a and 26b the lifting jack may be simply folded around the windmill column part and land on the pedestal adaptor 51 with its fixing members.

Furthermore, the windmill generator 120 in FIG. 3 may also be placed later, i.e. after provision of the first windmill column part 110-1. In that case it may be directly mounted on the first windmill column part 110-1 instead of on the lifting jack 90. Alternatively, the windmill generator 120 in FIG. 3 may be placed on an already lifted (extended) lifting jack 90, even if no windmill column part 110-1 is placed underneath.

In addition, the windmill column parts 110-1 . . . 110-3 may be partially replaced by (a) telescopic windmill column (part(s). The lifting jack 90 may be conveniently used to sequentially extend the telescopic column parts.

Alternatively, the windmill blades 130-1 . . . 130 . . . 3 in FIGS. 10 to 16 may be installed after installation of two or more windmill column parts 110-1 . . 110-3. On one side this means that the crane may need to reach higher or be larger, while on the other side this allows for the installation of larger windmill blades.

The particular embodiments disclosed above are illustrative only, and they may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of this disclosure. Accordingly, the protection sought herein is as set forth in the claims below.

It should be noted that the above-mentioned embodiments illustrate rather than limit this disclosure, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claim enumerating several means, several of these means may be embodied by one and the same item of hardware.

The invention claimed is:

1. Method of building an offshore windmill on a windmill pedestal that is located offshore, comprising:
providing a floating vessel comprising a 3D-heave-compensated crane on a deck thereof;
providing at least one offshore windmill assembly and a lifting jack, wherein the offshore windmill assembly comprises a windmill generator, a plurality of windmill blades and at least two windmill column parts for forming a windmill column at a later stage, wherein the lifting jack is configured for receiving the windmill column in a receiving region thereof;
moving said floating vessel, the lifting jack and the at least one offshore windmill assembly in proximity of the windmill pedestal;
placing the lifting jack directly on the windmill pedestal using the 3D-heave-compensated crane and fixing the lifting jack to the windmill pedestal such that it can be later removed, and wherein the lifting jack is fixed to the windmill pedestal such that the windmill column can be placed within the receiving region directly on the windmill pedestal;
installing the windmill generator using the 3D-heave-compensated crane;
partially erecting the windmill column on the windmill pedestal using the 3D-heave-compensated crane and the lifting jack;
installing the windmill blades on the windmill generator using the 3D-heave-compensated crane at a stage where the windmill column has been partially erected;
fully erecting the windmill column on the windmill pedestal using at least the lifting jack;
removing the lifting jack from the windmill pedestal using the 3D-heave-compensated crane.

2. The method according to claim 1, wherein the method further comprises, before placing the lifting jack, preparing the windmill pedestal for receiving the lifting jack.

3. The method according to claim 1, wherein, in installing the windmill generator, the windmill generator is installed on the lifting jack.

4. The method according to claim 1, wherein, in partially erecting the windmill column, at least a first one of the at least two windmill column parts is installed on the windmill pedestal, and wherein, in fully erecting the windmill column, the remaining ones of the windmill column parts are installed using the lifting jack for creating room between the windmill pedestal and the remaining part of the windmill column, as well as using the 3D-heave-compensated crane for moving the respective windmill column parts from the floating vessel to the pedestal.

5. The method according to claim 1, wherein, in providing the floating vessel, the at least two windmill column parts that are provided on the floating vessel are in the form of a telescopic windmill column in its retracted state.

6. The method according to claim 5, wherein, in partially erecting the windmill column, the telescopic windmill column is installed in its retracted state on the windmill pedestal, and wherein, in fully erecting the windmill column, the lifting jack is used to extend the telescopic windmill column.

7. The method according to claim 1, wherein, in installing the windmill blades, the windmill blades are installed sequentially, wherein the windmill generator is used to manipulate a position of a windmill hub of the windmill generator such that the respective windmill blade can be mounted thereto.

8. The method according to claim 1, wherein, in providing the floating vessel, the floating vessel is provided with an enhanced lifting jack that further comprises a cradle that is configured for i) receiving respective windmill parts, for ii) bringing said parts from a lower end of the lifting jack to an upper end of lifting jack for iii) manipulating, i.e. rotating, said parts to a vertical position, and for iv) bringing said parts to said receiving region.

9. Method of building an offshore windmill on a windmill pedestal that is located offshore, comprising:
placing a lifting jack having a receiving region on the windmill pedestal using a 3D-heave-compensated crane that is positioned on a floating vessel, and fixing the lifting jack to the windmill pedestal such that the lifting jack can be later removed, and such that a windmill column can be placed within the receiving region directly on the windmill pedestal;
installing a windmill generator using the 3D-heave-compensated crane;
partially erecting the windmill column on the windmill pedestal using the 3D-heave-compensated crane and the lifting jack;
installing a plurality of windmill blades on the windmill generator using the 3D-heave-compensated crane at a stage where the windmill column has been partially, but not fully, erected;
completing the erection of the windmill column on the windmill pedestal using at least the lifting jack;
removing the lifting jack from the windmill pedestal using the 3D-heave-compensated crane.

10. The method according to claim 9, wherein the method further comprises, before placing the lifting jack, preparing the windmill pedestal for receiving the lifting jack.

11. The method according to claim 9, wherein, installing the windmill generator comprises installing the windmill generator on the lifting jack.

12. The method according to claim 9, wherein the windmill column comprises at least two windmill column parts, and wherein partially erecting the windmill column comprises installing at least a first one of the at least two windmill column parts on the windmill pedestal, and wherein completing the erection of the windmill column comprises installing the remaining ones of the windmill column parts using the jack for creating room between the windmill pedestal and the remaining part of the windmill column.

13. The method according to claim 9, wherein the windmill column comprises at least two windmill column parts, and wherein the at least two windmill column parts are in the form of a telescopic windmill column in its retracted state.

14. The method according to claim 13, wherein, in partially erecting the windmill column, the telescopic windmill column is installed in its retracted state on the windmill pedestal, and wherein, in completing the erection of the windmill column, the lifting jack is used to extend the telescopic windmill column.

15. The method according to claim 9, wherein, in installing the windmill blades, the windmill blades are installed sequentially, wherein the windmill generator is used to manipulate a position of a windmill hub of the windmill generator such that the respective windmill blade can be mounted thereto.

16. The method according to claim 9, wherein, the lifting jack comprises a cradle that is configured for i) receiving respective windmill parts, for ii) bringing said parts from a lower end of the lifting jack to an upper end of lifting jack, for iii) manipulating said windmill parts to a vertical position, and for iv) bringing said windmill parts to said receiving region.

* * * * *